US009942169B1

(12) United States Patent
Detwiler

(10) Patent No.: US 9,942,169 B1
(45) Date of Patent: Apr. 10, 2018

(54) SYSTEMS AND METHODS FOR EFFICIENTLY SEARCHING FOR STORED DATA

(71) Applicant: Thomas Frederick Detwiler, Huntsville, AL (US)

(72) Inventor: Thomas Frederick Detwiler, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 131 days.

(21) Appl. No.: 14/558,679

(22) Filed: Dec. 2, 2014

(51) Int. Cl.
*H04L 12/947* (2013.01)
*H04L 12/741* (2013.01)

(52) U.S. Cl.
CPC ............ *H04L 49/25* (2013.01); *H04L 45/745* (2013.01)

(58) Field of Classification Search
CPC .............................. H04W 24/08; H04W 28/02
USPC .......................................... 370/360; 709/223
See application file for complete search history.

(56) References Cited

U.S. PATENT DOCUMENTS

| 6,549,519 B1* | 4/2003 | Michels .................. H04L 12/56 370/238 |
| 2003/0189924 A1* | 10/2003 | Kadambi .............. H04L 49/351 370/360 |
| 2004/0042463 A1* | 3/2004 | Guerrero ............. H04L 45/7453 370/395.31 |
| 2004/0117468 A1* | 6/2004 | Wang ...................... H04L 47/10 709/223 |
| 2013/0091399 A1* | 4/2013 | Hu ........................ H03M 13/13 714/752 |
| 2016/0099810 A1* | 4/2016 | Li .......................... H04L 9/0894 713/193 |

* cited by examiner

*Primary Examiner* — Marsha D Banks Harold
*Assistant Examiner* — Natasha W Cosme
(74) *Attorney, Agent, or Firm* — Maynard Cooper & Gale, P.C.; Jon E. Holland

(57) ABSTRACT

A memory system has a plurality of memory stages in which each stage stores a respective portion of a data table. A request for reading an entry of the table is processed serially by the memory stages, and each stage narrows the range of table entries possibly storing the requested data. Based on the results of the previous stages, the final stage is able to quickly determine whether the requested data is stored in the data table and, if so, to retrieve the requested data from such table.

19 Claims, 14 Drawing Sheets

| Address | Pointer |
|---------|---------|
| 0 | 3 |
| 1 | x |
| 2 | x |
| 3 | 4 |
| 4 | 6 |
| 5 | x |
| 6 | 6 |
| 7 | x |
| 8 | x |

| Head Pointer | Tail Pointer | QDI |
|--------------|--------------|-----|
| 0 | 6 | 4 |

| Head Pointer | Tail Pointer | QDI |
|--------------|--------------|-----|
| 0 | 8 | 5 |

| Address | Pointer |
|---------|---------|
| 0 | 3 |
| 1 | x |
| 2 | x |
| 3 | 4 |
| 4 | 6 |
| 5 | x |
| 6 | 8 |
| 7 | x |
| 8 | 8 |

← 105

| Head Pointer | Tail Pointer | QDI |
|---|---|---|
| 3 | 6 | 3 |

| Address | Pointer |
|---|---|
| 0 | x |
| 1 | x |
| 2 | x |
| 3 | 4 |
| 4 | 6 |
| 5 | x |
| 6 | 6 |
| 7 | x |
| 8 | x |

FIG. 12

| Physical Address | Memory Chip |
|---|---|
| 1 | 201a |
| 2 | 201b |
| 3 | 201c |
| 4 | 201d |
| 5 | 201c |
| 6 | 201d |
| 7 | 201e |
| 8 | 201f |

← 84

| Address | Path Identifier | Data |
|---------|-----------------|------|
| 0000 | 1 | Port ID 1 |
| 0001 | 5 | Port ID 2 |
| 0010 | 7 | Port ID 3 |
| 0011 | 8 | Port ID 4 |
| 0100 | 11 | Port ID 5 |
| 0101 | 17 | Port ID 6 |
| 0110 | 19 | Port ID 7 |
| 0111 | 22 | Port ID 8 |
| 1000 | 25 | Port ID 9 |
| 1001 | 26 | Port ID 10 |
| 1010 | 27 | Port ID 11 |
| 1011 | 33 | Port ID 12 |
| 1100 | 36 | Port ID 13 |
| 1101 | 38 | Port ID 14 |
| 1110 | 41 | Port ID 15 |
| 1111 | 42 | Port ID 16 |

| Address | Path Identifier |
|---|---|
| 1000 | 25 |

| Address | Path Identifier |
|---|---|
| 0100 | 11 |
| 1100 | 36 |

| Address | Path Identifier |
|---|---|
| 0010 | 7 |
| 0110 | 19 |
| 1010 | 27 |
| 1110 | 41 |

FIG. 20

| Address | Path Identifier - LSB 0 | Path Identifier - LSB 1 | Data - LSB 0 | Data - LSB 1 |
|---|---|---|---|---|
| 000 | 1 | 5 | Port ID 1 | Port ID 2 |
| 001 | 7 | 8 | Port ID 3 | Port ID 4 |
| 010 | 11 | 17 | Port ID 5 | Port ID 6 |
| 011 | 19 | 22 | Port ID 7 | Port ID 8 |
| 100 | 25 | 26 | Port ID 9 | Port ID 10 |
| 101 | 27 | 33 | Port ID 11 | Port ID 12 |
| 110 | 36 | 38 | Port ID 13 | Port ID 14 |
| 111 | 41 | 42 | Port ID 15 | Port ID 16 |

FIG. 21

| Address | Path Identifier - LSBs 00 | Path Identifier - LSBs 01 | Path Identifier - LSBs 10 | Path Identifier - LSBs 11 |
|---|---|---|---|---|
| 00 | 1 | 5 | 7 | 8 |
| 01 | 11 | 17 | 19 | 22 |
| 10 | 25 | 26 | 27 | 33 |
| 11 | 36 | 38 | 41 | 42 |

FIG. 23

SYSTEMS AND METHODS FOR EFFICIENTLY SEARCHING FOR STORED DATA

RELATED ART

Switches are used within telecommunication networks, such as the publicly switched telephone network (PSTN), to send data packets from one location to another. A switch often has a plurality of ports connected to other network devices, and the switch also has various forwarding tables indicating how packets are to be forwarded. When a packet is received on one port, the switch analyzes information contained in the packet's header, such as virtual local area network (VLAN) tags, destination addresses, and source addresses, and compares such information to the switch's forwarding tables to identify one or more ports to which the packet is to be forwarded. In this manner, a packet may be forwarded from switch-to-switch through a network toward its destination.

In general, it is desirable for a switch to process packets as quickly as possible in order to minimize network delays and maximize use of available bandwidth capacity. However, it also may be desirable to increase the number of ports on a switch in order to accommodate more paths and traffic. As the number of ports increases, the complexity and cost of the switch are likely to increase as well, and the additional complexity can result in processing delays within the switch. Further, many switch architectures are not easily scalable to a large number of ports without incurring significant costs or processing delays. More efficient switch architectures are generally desired, particularly for large-scale switches having a large number of ports.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 5 is a block diagram illustrating an exemplary set of allocation data, such as is depicted by FIG. 4, showing that four memory units have been allocated to an egress queue.

FIG. 6 is a block diagram illustrating an exemplary entry of a queue state table, such as is depicted by FIG. 1, for an egress queue to which memory units have been allocated according to the allocation data depicted by FIG. 5.

FIG. 7 is a block diagram illustrating the entry of FIG. 6 after allocation of an additional memory unit to the egress queue.

FIG. 8 is a block diagram illustrating the allocation data of FIG. 5 after allocation of an additional memory unit to the egress queue.

FIG. 11 is a block diagram illustrating the entry of FIG. 6 after deallocation of a memory unit from the egress queue.

FIG. 12 is a block diagram illustrating the allocation data of FIG. 5 after deallocation of a memory unit from the egress queue.

FIG. 17 is a block diagram illustrating an exemplary forwarding table, such as is depicted in FIG. 16.

FIG. 18 is a block diagram illustrating a portion of the forwarding table of FIG. 17 stored in a stage of the memory system depicted by FIG. 16.

FIG. 19 is a block diagram illustrating a portion of the forwarding table of FIG. 17 stored in a stage of the memory system depicted by FIG. 16.

FIG. 20 is a block diagram illustrating a portion of the forwarding table of FIG. 17 stored in a stage of the memory system depicted by FIG. 16.

FIG. 21 is a block diagram illustrating an exemplary structure of the forwarding table of FIG. 17.

FIG. 23 is a block diagram illustrating an exemplary structure of the forwarding table of FIG. 17.

DETAILED DESCRIPTION

The present disclosure generally pertains to systems and methods for efficiently search for data stored in a packet switch or other type of device. In one exemplary embodiment, a network switch allocates large-scale memory units as data packets are received in order to implement per-queue, circular egress buffers. Each large-scale memory unit is larger than the maximum packet length of the received packets and is capable of storing a plurality of data packets thereby reducing the number of memory allocation events that are required to process a given number of data packets. Efficient techniques for writing to and reading from the large-scale egress memory units have been developed and may be used to reduce processing delays. Such techniques are compatible with relatively inexpensive memory devices, such as dynamic random access memory (DRAM), that may be separate from the circuitry used to process the data packets. The architectures described herein are easily scalable so that that a large number of ports (e.g., thousands) may be implemented at a relatively low cost and complexity without introducing significant processing delays.

Figure 1:
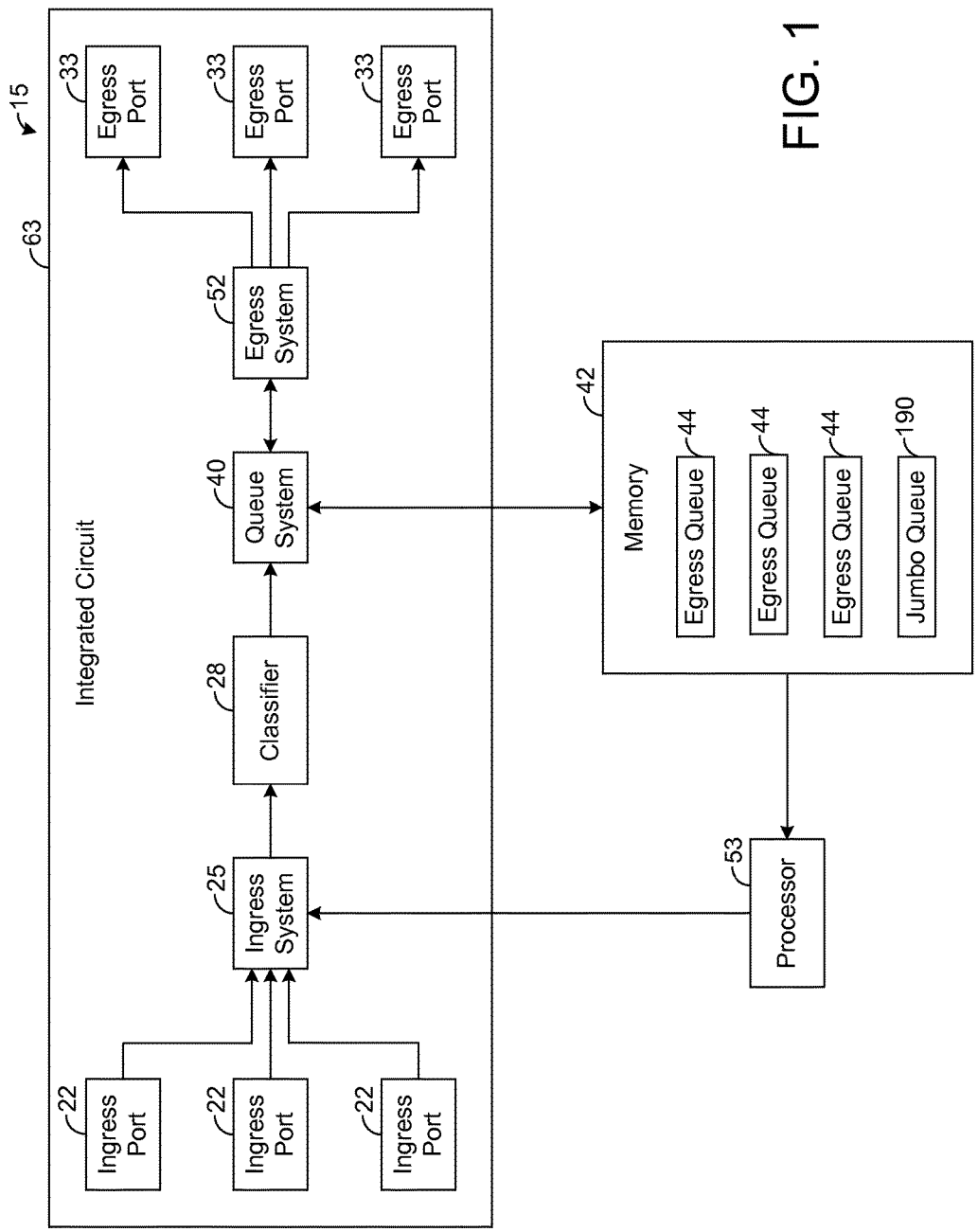
FIG. 1 is a block diagram illustrating an exemplary embodiment of a network switch.

FIG. 1 depicts an exemplary embodiment of a network switch 15. As shown by FIG. 1, the switch 15 has a plurality of ports 22, referred to herein as "ingress ports," that receive data packets from other network devices (not shown) in a network. In at least one embodiment, the data packets are in accordance with Ethernet protocols, but other protocols are possible in other embodiments. Each ingress port 22 comprises physical-layer communication devices (e.g., transceivers) for communicating across a communication medium coupled to the port 22, such as a conductive connection (e.g., printed circuit board wires, or twisted-wire pair) or an optical connection (e.g., an optical fiber). Alternatively, the ports 22 may be configured to communicate with other network devices wirelessly.

As shown by FIG. 1, the data packets received by the ingress ports 22 flow to an ingress system 25 that buffers and parses the packets, as will be described in more detail below. The packets are then fed to a classifier 28 that classifies the packets and makes forwarding decisions. In this regard, for each data packet, the classifier 28 analyzes the packet's overhead information to determine various attributes about the packet. As an example, the classifier 28 may search the packet's overhead information to locate certain information, such as source and destination addresses, as well as other types of attributes. For example, for Ethernet packets, the classifier 28 may be configured to find the packet's source media access control (MAC) address, destination MAC address, and virtual local area network (VLAN) tags, if the packet contains VLAN tags. Data indicative of such attributes, referred to herein as "attribute data," is extracted from the packets or otherwise determined by the classifier 28, and the attribute data is used to make forwarding decisions for the packet, as will be described in more detail hereafter. As an example, the classifier 28 may determine that the packet is to be forwarded to one or more ports 33, referred to herein as "egress ports," from which the packet is to egress the switch 15 for transmission to one or more other network devices. Like the ingress ports 22, each egress port 33 comprises physical-layer communication devices (e.g., transceivers) for communicating across a communication medium coupled to the port 33.

After a data packet has been analyzed by the classifier 28 and before it is sent to an egress port 33, the data packet along with its associated attribute data are fed to a queue system 40 that is configured to buffer the data packet in memory 42. In this regard, the queue system 40 is configured to allocate large-scale blocks of memory, referred to herein as "memory units," in order to implement a plurality of queues 44, referred to herein as "egress queues." Each egress queue 44 is associated with a respective egress port 33 and a respective priority. In this regard, each packet stored in an egress queue 44 is ultimately pulled from such queue 44 on a first-in, first-out (FIFO) basis and transmitted to the egress port 33 that is associated with the queue 44. Thus, only packets to be forwarded to the associated egress port 33 are inserted into a given egress queue 44.

Note that there may be multiple egress queues 44 associated with the same egress port 33 in order to provide for priority scheduling, as is known in the art. In this regard, only packets of the same priority are buffered in the same egress queue 44 so that scheduling decisions can be made based on priority. As an example, over a given time period, more packet data may be pulled from an egress queue 44 of a higher priority so that flows assigned such priority meet more stringent performance minimums. The concept of priority scheduling is generally well-known and will not be described in detail herein.

In one embodiment, each egress queue 44 is implemented as a circular buffer so that memory may be dynamically allocated to the queue 44 as it is needed, thereby helping to reduce the overall memory requirements of the switch 15.

That is, the size of the egress queue 44 can be dynamically increased when there is a greater amount of packet data to be buffered by the queue 44, and the size of the egress queue 44 can be dynamically decreased when there is a lesser amount of packet data to be buffered by the queue 44. Specifically, when more memory is needed for a given egress queue 44, the queue system 40 is configured to allocate one or more memory units to the queue in order to increase the queue's size. As packets are pulled from the queue, the queue system 40 may deallocate memory units from which all previously-stored packets have been pulled, thereby freeing the memory unit for use by other queues 44. Allocation or deallocation of at least one memory unit shall be referred to as an "allocation event."

The memory units allocated by the queue system 40 are "large-scale" in the sense that the size of a single memory unit exceeds the maximum packet length expected for any packet to be processed by the switch 15. Thus, a plurality of data packets can be stored in a single memory unit thereby reducing the number of allocation events that are required to process the data packets passing through the switch 15. For illustrative purposes, it will be assumed hereafter that the size of each memory unit is the same, but it is possible for different memory units to have different sizes in other embodiments.

In addition, as is known in the art, the classifier 28 may be configured to drop data packets from time-to-time for a variety of reasons. As an example, during periods of congestion, the classier 28 may be configured to drop data packets in order to prevent overruns in the queue system 40. Since the allocation of memory units occurs after the classifier 28 has made forwarding decisions, a data packet dropped by the classifier 28 or at any point prior to the queue system 40 should not trigger an allocation event, helping to reduce the number of allocation events that occur in the switch 15.

As shown by FIG. 1, the switch 15 comprises an egress system 52 that is configured to request data packets from the egress queues 44 and to forward the data packets to the egress ports 33. The egress system 52 will be described in more detail below.

Note that some packets are marked for exception such that they are forwarded to a processor 53 for processing rather than being forwarded to an egress port 33. In this regard, using the same techniques described herein to implement the egress queues 44, one or more queues (referred to herein as "exceptions queues") may be implemented in the memory 42. The sizes of the exceptions queues may be dynamically adjusted in the same manner described above for the egress queues 44 depending on the amount of packet data to be buffered in each exceptions queue. The processor 53 is configured to pull packets from the exceptions queue and to process the packets as may be desired depending on the types of exceptions detected for such packets. Like the egress queues 44, the exceptions queues may be prioritized so that higher priority traffic can be processed by the processor 53 faster during periods of congestion. After processing by the processor 53, the packets may be sent to the ingress system 25 for introduction of the packets back into the flow from the ingress system 25 to the egress ports 33. In one embodiment, the processor 53 stores and executes software or firmware for handling the exceptions detected by the classifier 28. Other configurations of the processor 53 are possible in other embodiments.

Note also that ports 22 and 33 may be bi-directional. Thus, it is possible for a port 33 to receive data packets on ingress to the switch 15 in which case the port 33 would be configured like the ingress ports 22 shown by FIG. 1 to forward packets to the ingress system 25, classifier 28, queue system 40, and egress system 52. Similarly, a port 22 may be coupled to the egress system 52 such that it receives a data packet for egress that has previously passed through the ingress system 25, classifier 28, queue system 40, and egress system 52. FIG. 1 shows a plurality of packet flows that pass from the ports 22 to the ports 33, and these ports 22 and 33 have been termed "ingress" and "egress," respectively, for illustrative purposes. Such terms are relative to the packet flows shown by FIG. 1, and all packets for such packet flows pass through the switch 15 from the ingress ports 22 toward the egress ports 33.

It should be further noted that the switch 15 may be implemented in hardware or a combination of hardware with software or firmware. In the exemplary embodiment shown by FIG. 1, the ingress ports 22, ingress system 25, classifier 28, queue system 40, egress system 52, and egress ports 33 are all implemented in hardware within an integrated circuit 63. As an example, such components may be implemented in a field programmable gate array (FPGA) or an application-specific integrated circuit (ASIC). In other embodiments, other configurations of the switch 15 are possible, and it is unnecessary for the foregoing components to reside within a single integrated circuit. An integrated circuit, such as an FPGA, typically has a limited amount of memory, which is used in the embodiment depicted by FIG. 1 for storing control information and for a limited amount of buffering of packet data as such packet data flows through the integrated circuit 63. However, the egress queues 44, which may require a large amount of memory, are implemented external to the integrated circuit 63 in less expensive memory 42, such as DRAM, thereby reducing the overall cost of the switch 15. Since the egress queues 44 are external to the integrated circuit 63, the time required to communicate between the memory 42 in which the egress queues 42 reside may be longer relative to an embodiment for which the egress queues 44 are implemented by the integrated circuit 63. However, as will be described in more detail hereafter, the large-scale nature of the memory units allocated for the egress queues 44 reduces the number of allocation events that are required, helping to offset the added communication delay of using memory 42 external to the integrated circuit 63 for implementing the egress queues 44.

Figure 2:
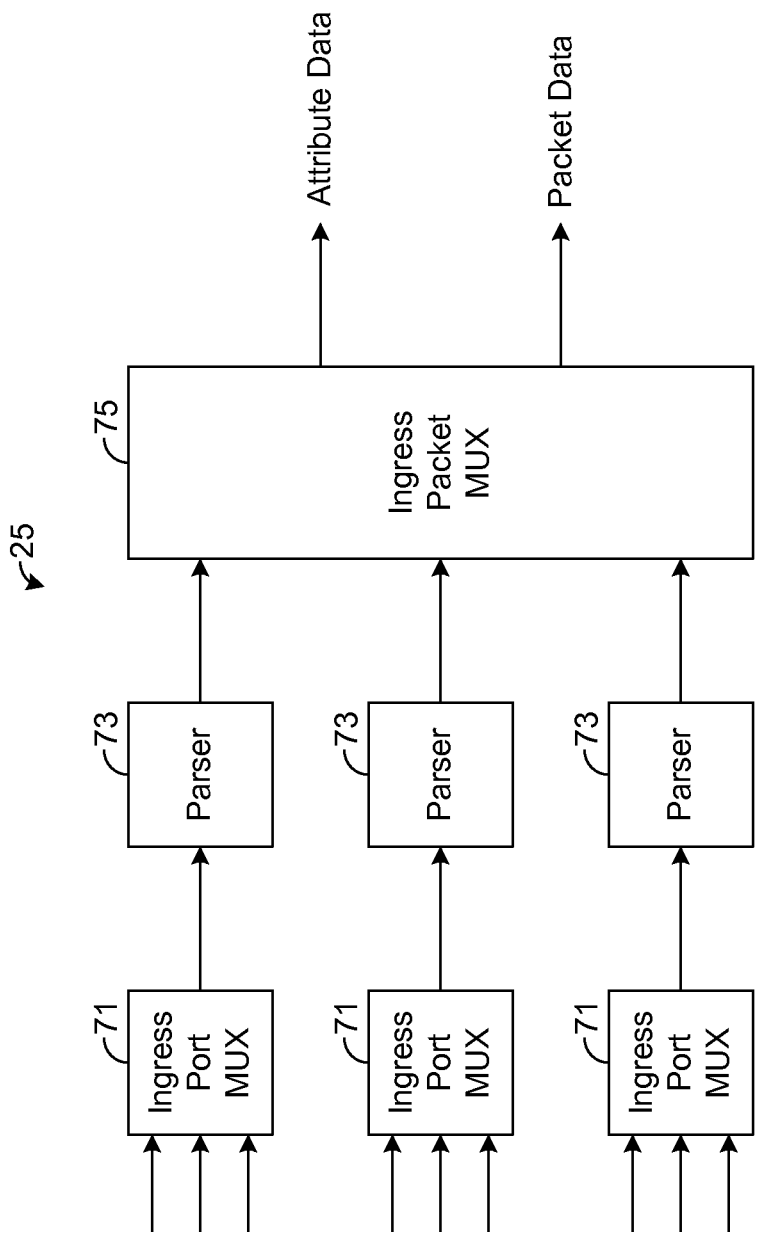
FIG. 2 is a block diagram illustrating an exemplary embodiment of an ingress system of a network switch, such as is depicted by FIG. 1.

FIG. 2 depicts an exemplary embodiment of the ingress system 25. As shown by FIG. 2, the ingress system 25 comprises a plurality of ingress port multiplexers 71. Each ingress port multiplexer (MUX) 71 is coupled to and receives data packets from a plurality of ingress ports 22. Each ingress port multiplexer 71 transmits a stream of data packets to a respective parser 73 that parses the data packets to extract attribute data, such as addresses or tags, from the packet overhead. For each packet, a parser 73 transmits packet data defining the packet and the packet's attribute data in parallel to an ingress packet multiplexer 75, which multiplexes feeds from a plurality of parsers 73. For each packet, the ingress packet multiplexer 75 transmits the packet data defining the packet and the packet's attribute data to the classifier 28 (FIG. 1).

Figure 3:
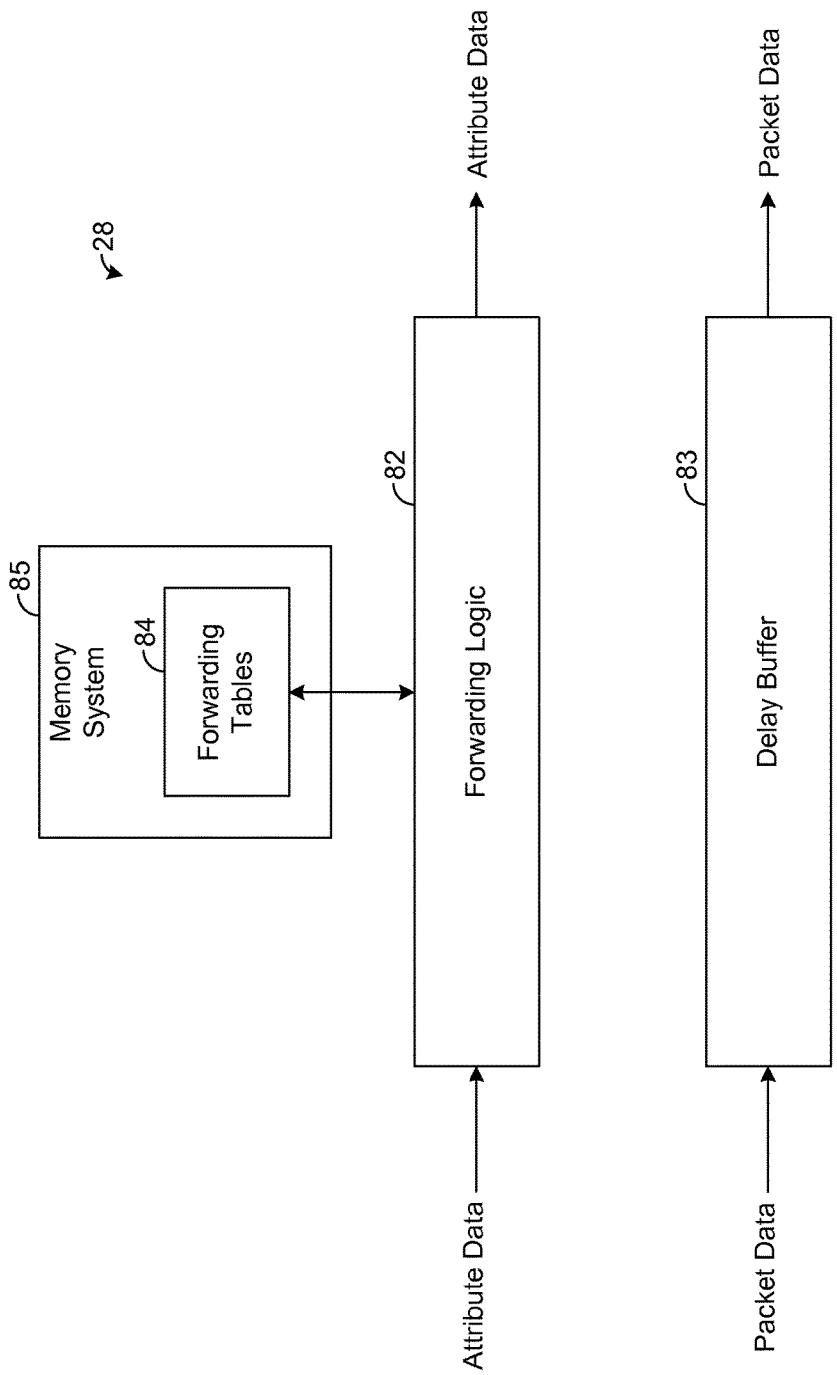
FIG. 3 is a block diagram illustrating an exemplary embodiment of a classifier of a network switch, such as is depicted by FIG. 1.

FIG. 3 depicts an exemplary embodiment of the classifier 28. As shown by FIG. 3, the classifier 28 comprises forwarding logic 82, a delay buffer 83, and a plurality of forwarding tables 84. The forwarding logic 82 is configured to receive and analyze a packet's attribute data in order to classify the packet and to determine how to forward the packet. Specifically, the forwarding logic 82 is configured to compare the attribute data to one or more forwarding tables 84 in order to make a forwarding decision for the packet. In this regard, the forwarding tables 84 have mappings that map attribute data, such as MAC addresses or VLAN tags, to port identifiers. The forwarding logic 82 searches the forwarding tables for an entry corresponding to the packet's attribute data, and if such an entry is found, the forwarding logic 82 determines that the packet is to be forwarded to the port 33 or ports 33 identified by such entry.

The forwarding logic 82 is further configured to update the attribute data to indicate to which queue 44 in memory 42 the packet is to be forward. As an example, if the forwarding logic 82 detects an exception associated with a packet, the forwarding logic 82 updates the attribute data to indicate that the packet is to be forwarded to the exceptions queue to await processing by the processor 53, as described above. If the forwarding logic 82 determines that the packet is to be forwarded to a particular egress port 33, the forwarding logic 82 is configured to update the packet's attribute data to identify an egress queue 44 that feeds such egress port 33 depending on the packet's priority. The forwarding logic 82 is also configured to monitor congestion in the switch 15 and, at times of congestion, to selectively drop packets in order to prevent uncontrolled data overruns. Notably, when packets are dropped, they are dropped by the forwarding logic 82 before they are stored in memory 42 (FIG. 1) such that the dropping of packets does not cause allocation events in the memory 42.

The delay buffer 83 receives the packet data and delays this data by an appropriate amount to match the delay of the packet's attribute data such that the packet and the packet's attribute data are simultaneously output by the classifier 28.

Figure 4:
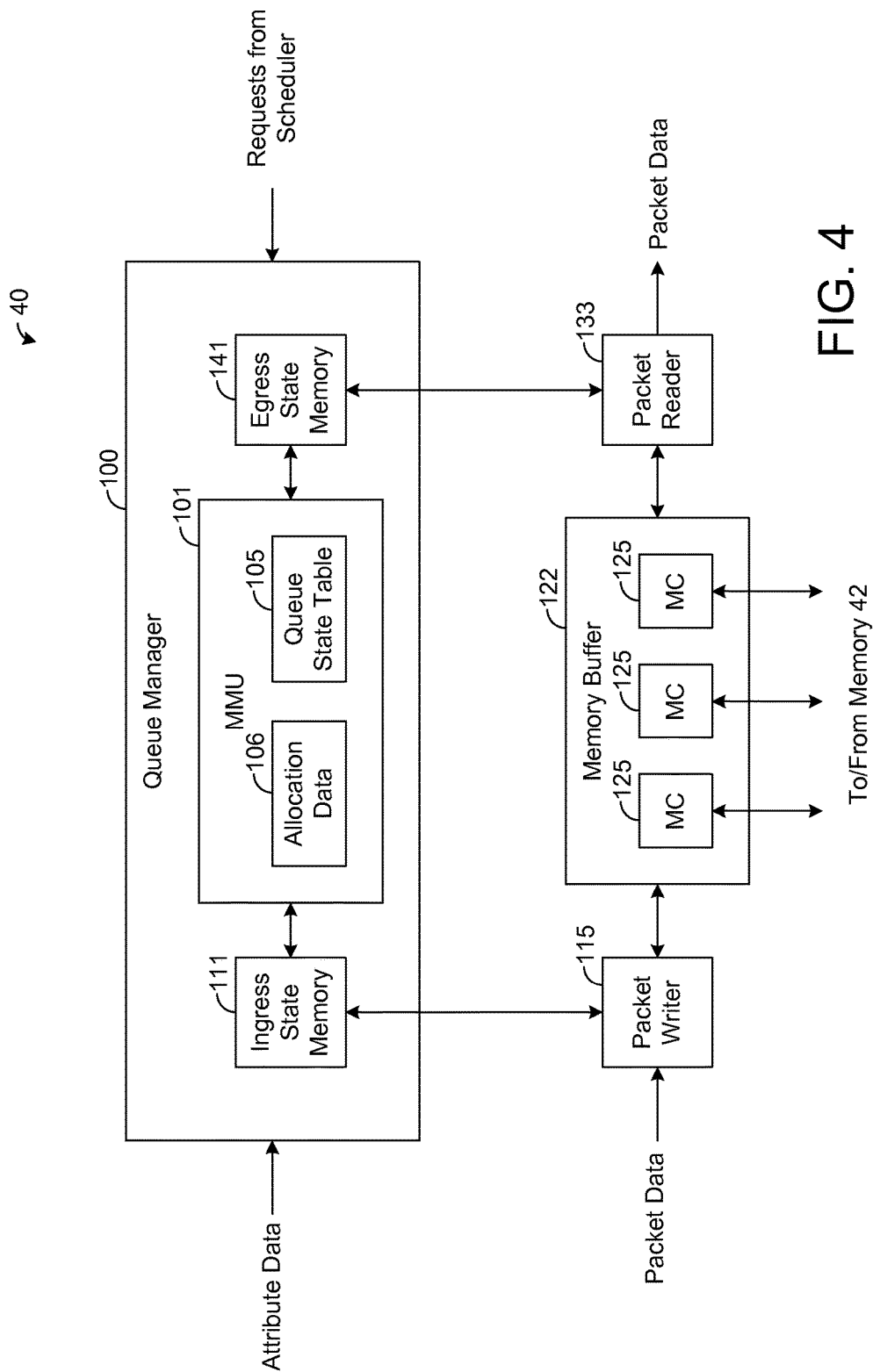
FIG. 4 is a block diagram illustrating an exemplary embodiment of a queue system of a network switch, such as is depicted by FIG. 1.

FIG. 4 depicts an exemplary embodiment of the queue system 40. As shown by FIG. 4, the queue system 40 comprises a queue manager 100 having a memory management unit (MMU) 101 that is configured to manage memory allocation events. For example, when the size of an egress queue 44 is to be increased so that more data can be written to the egress queue 44, the MMU 101 is configured to allocate an available memory unit (i.e., a memory unit that is not currently allocated) to the egress queue 44. In this regard, the queue manager 100 stores various control information indicating which memory units have been allocated to which queues, and the queue manager 100 is configured to update such control information each time a memory unit is allocated or deallocated. In one exemplary embodiment, such control information includes a queue state table 105 and allocation data 106, which will be described in more detail below.

The queue state table 105 has an entry for each egress queue 44 implemented by the memory 42. In one exemplary embodiment, each entry has three parameters: a head pointer, a tail pointer, and a queue depth indicator (QDI). In other embodiments, other types of parameters may be stored in the queue state table 105.

The head pointer of an entry of the queue state table 105 points to the memory unit at the head of the egress queue 44 that is associated with the entry. The memory unit at the head of the egress queue 44 is the oldest memory unit currently allocated to the queue 44, and this memory unit stores at least a portion of the oldest packet of the queue 44 or, in other words, the packet to be read next when data is pulled from the queue 44.

The tail pointer of an entry of the queue state table 105 points to the memory unit at the tail of the egress queue 44 that is associated with the entry. The memory unit at the tail of the egress queue 44 is the youngest memory unit currently allocated to the queue 44, and this memory unit stores at least a portion of the youngest packet of the queue 44. The next packet to be written to the queue 44 is to be written in such memory unit provided that there is space available in this memory unit.

The queue depth indicator of an entry of the queue state table 105 is a value indicating the total number of memory units currently allocated to the egress queue 44 that is associated with the entry. Thus, this indicator indicates the queue's current depth, as measured in allocation units.

The allocation data 106 has an entry for each memory unit in the memory 42. Each entry of the allocation data 106 has an address for identifying the memory unit that is associated with the entry, and each entry also has a pointer that will be described in more detail hereafter. In this regard, the allocation data 106 defines a linked list of entries for each egress queue 44 implemented in the memory 42. Specifically, the entry associated with the memory unit at the head of an egress queue 44 (i.e., the oldest memory unit allocated to the queue 44) has a pointer that points to the entry associated with the next memory unit allocated to the same egress queue 44 (i.e., the next oldest memory unit allocated to the queue 44). Each entry associated with the queue 44 similarly points to the entry associated with the next oldest memory unit except for the entry associated with the memory unit at the tail of the egress queue 44 (i.e., the last or youngest memory unit of the egress queue 44). The pointer of such memory unit may point to itself to indicate that it represents the last memory unit of the queue 44, or the pointer may be set to a predefined value for indicating the end of the linked list for the egress queue 44. Thus, each entry of a linked list for a given egress queue 44 is associated with a respective memory unit of the queue 44. By traversing or otherwise analyzing the linked list, each memory unit allocated to the associated queue 44 can be identified.

To better illustrate the foregoing, assume that the allocation data 106 represents nine memory units, though it is likely that the number of memory units will be much greater in practice. FIG. 5 shows exemplary entries of the allocation data 106 for such an example, and FIG. 6 shows an exemplary entry of the queue state table 105 for the same example. Each entry in FIG. 5 represents a respective memory unit and stores an address and pointer. The address identifies the memory unit represented by the entry (e.g., identifies the memory location at the beginning of the memory unit), and the pointer generally points to the next memory unit allocated to the same egress queue 44. If the memory unit represented by an entry of the allocation data 106 is not currently allocated to an egress queue 44, the pointer of the entry corresponding to such memory unit may be set to a unique value "x" indicating that the memory unit is available for allocation. When allocating a new memory unit, the MMU 101 may search the allocation data 106 for an entry having a pointer set to such value "x" in order to identify the memory unit that is to be allocated. In other embodiments, other techniques for finding an available memory unit are possible.

For illustrative purposes, assume that memory units "0," "3," "4," and "6" are allocated to a particular egress queue 44 in that order. In such example, "0" is the address of the head memory unit for the egress queue 44, and "6" is the address of the tail memory unit for the egress queue 44. As shown by FIG. 5, the entry of the data 106 representing memory unit "0" points to memory unit "3," and the entry of the data 106 representing memory unit "3" points to memory unit "4." Further, the entry of the data 106 representing memory unit "4" points to memory unit "6." Since memory unit "6" is the tail of the egress queue 44, the pointer of the entry representing this memory unit "6" points to itself, thereby indicating that this memory unit "6" is the tail of the egress queue 44. Alternatively, the pointer of such memory unit may be set to a predefined value or otherwise controlled to indicate that this memory unit is the tail.

As shown by FIG. 6, the entry of the queue state table 105 representing the foregoing egress queue 44 has a head pointer that points to memory unit "0" and a tail pointer that points to memory unit "6". This entry also has a queue depth indicator indicating that there are a total of four memory units currently allocated to the egress queue 44.

As shown by FIG. 4, the queue manager 100 has ingress state memory 111 that stores a respective write offset value for each egress queue 44 and a respective write byte count for each egress queue 44. The write offset value indicates the memory offset of the tail memory unit of the associated egress queue 44 where data is to be written next. In this regard, the write offset generally indicates the next memory location after the last memory location to which data was most recently written. Thus, as data is written to a memory unit, the write offset is increased until the end of the memory unit is reached indicating that the memory unit is full. When this occurs, a new memory unit is allocated to the egress queue, and the write offset is reset so that it effectively points to the beginning of the newly-allocated memory unit.

The write byte count indicates the number of bytes that have been written to the associated egress queue 44. As an example, the write byte count may be incremented for each byte written to the egress queue 44 such that it represents a running sum of the number of bytes written.

When a data packet passes from classifier 28 to the queue system 40, the packet data is received by a packet writer 115 while the packet's attribute data is received by the queue manager 100. Based on the attribute data, which identifies the egress queue 44 to which the data packet is to stored, the MMU 105 consults the queue state table 105 to determine which memory unit is the tail of the identified egress queue 44. The MMU 105 passes the address of this memory unit and the write offset associated with the identified queue buffer 44, as indicated by the ingress state memory 111, to the packet writer 115. The packet writer 115 communicates with a memory system buffer 122 so that the packet is written in the identified memory unit starting at the memory location indicated by the write offset. In this regard, the memory system buffer 122 has a plurality of memory controllers 125 each of which may be coupled to a respective memory chip of the memory 42 for writing to and reading from such memory chip based on instructions from the packet writer 115 and the packet reader 133, which will be described in more detail hereafter. After performing a write operation to a given memory unit, the packet writer 115 updates the write offset and the byte count (stored in ingress state memory 111) for the queue buffer 44 as appropriate so that the next write operation begins just after the end of the last write operation.

As described herein, each memory unit is sized to be greater than sizes of the data packets being processed. Thus, more than one data packet can fit into a given memory unit. Indeed, it is possible for a memory unit to be sized such that any number of data packets is capable of fitting in the memory unit, as may be desired. Increasing the size of the memory unit so that more data packets can fit into it generally has the effect of reducing the number of occurrences of allocation events that are performed by the queue manager 100 in managing the memory resources of the switch 15, as will be apparent from this disclosure.

In any event, when a memory unit becomes filled, the packet writer 115 communicates with the queue manager 100 to request allocation of a new memory unit to the egress queue 44 so that additional data can be written to the egress queue 44. In response, the MMU 101 allocates a new memory unit. Specifically, the MMU 101 consults the queue state table 105 to determine the current tail of the egress queue 44. For the example described above with reference to FIG. 6, the tail is memory unit "6". The MMU 101 allocates a new memory unit to the egress queue 44, and this new memory unit becomes the new tail of the egress queue 44. The MMU 101 is configured to then update the queue state table 105 and the allocation data 106 to reflect this new allocation. For example, in the scenario described above where the current tail is memory unit "6", assume that the MMU 101 allocates memory unit "8" to the egress queue 44. In such case, the MMU 101 updates the tail pointer in the queue state table 105 so that it points to memory unit "8," and the MMU 101 increments the queue depth value to indicate that a new memory unit has been allocated to the egress queue 44, as shown by FIG. 7. The MMU 101 also updates the allocation data 106 such that memory unit "8" is indicated as a tail of the linked list representing the egress queue 44, as shown by FIG. 8. After allocating a new memory unit to the egress queue 44, the MMU 101 passes the address of the newly-allocated memory unit to the packet writer so that the packet writer 115 can continue writing to the egress queue 44 in the newly-allocated memory unit.

Figure 9:
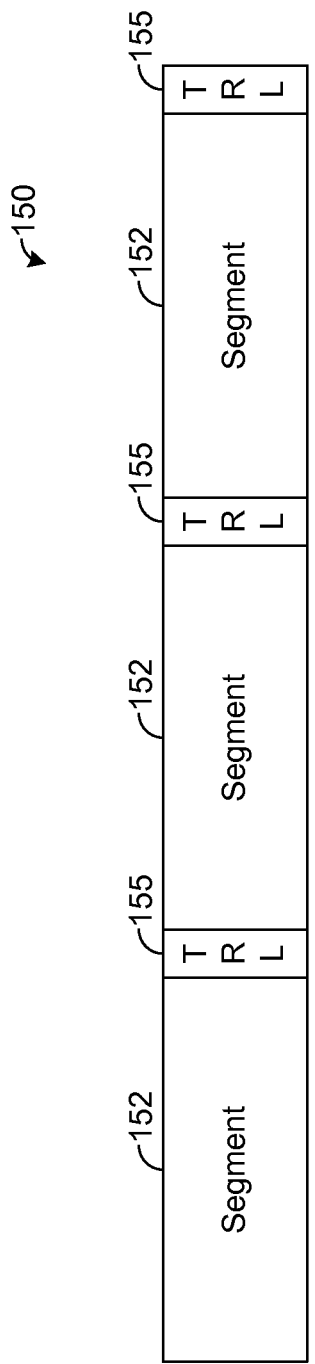
FIG. 9 is a block diagram illustrating an exemplary memory unit.

In one exemplary embodiment, each memory unit is partitioned into a plurality of segments. FIG. 9 depicts an exemplary memory unit 150 having three segments 152, though the memory unit 150 may have any number of segments in other embodiments. At the end of each segment 152 is a portion 155 of memory, referred to as a "trailer," reserved for storing certain control information to be used for reading packets from the memory unit 150 as will be described in more detail hereafter. In one exemplary embodiment, each memory unit 150 is 32-128 kilobytes (kB) depending on the number of egress queues 44 and the size of memory 42, each segment 152 is 1 kB, and each trailer 155 is thirty-two bits. However, other sizes of the memory units 150, segments 152, and trailers 155 are possible in other embodiments.

Figure 10:
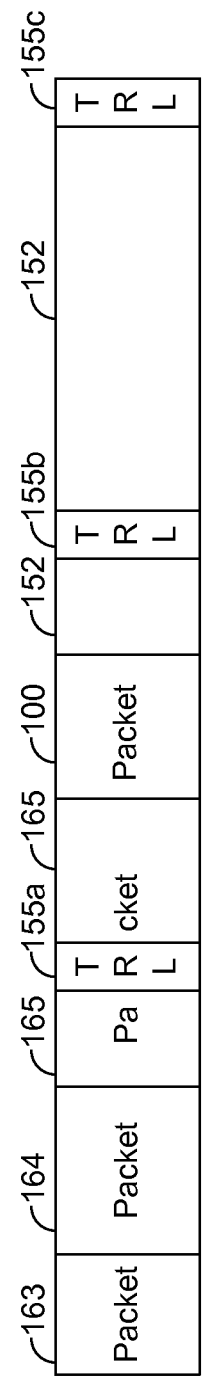
FIG. 10 is a block diagram illustrating the memory unit of FIG. 9 after three data packets have been written to the memory unit.

FIG. 10 depicts a memory unit 150 having three segments 152 and three trailers 155a-c where each trailer 155a-c follows a respective segment. The memory unit 150 of FIG. 10 is shown after four data packets 163-166 have been written to the memory unit 150. As shown by FIG. 10, the penultimate packet 165 spans across a trailer 155a. In this regard, if the end of a segment 152 is reached while there is more data of a data packet to be written, the packet writer 115 stops writing packet data and begins to write control information into the trailer 155a-c. When the end of the trailer 155a-c is reached, the packet writer 115 resumes writing the data packet such that the data packet effectively skips the trailer 155a-c, which is filled with control information. Thus, in the memory unit 150 shown by FIG. 10, the packet writer 115 reached the end of the first segment 152 while writing data packet 165 and began writing control information into trailer 155a before fully writing the packet 165. After writing the trailer 155a, the packet writer 115 resumed writing the remainder of the data packet 165 after the trailer 155a.

The control information in the trailers 155a-c preferably indicate the boundaries of packets that are stored in the memory unit 150 so that it is unnecessary for the queue manager 100 to track the precise location of each packet in the memory unit 150 using control information that is stored in the integrated circuit 63. The packet writer 115, as it is writing packet data to the memory unit 150, writes control information in the trailers 155a-c, and this control information is later used by the packet reader 133 to efficiently read packets from the memory unit 150. In this regard, if a certain packet is to be read from the memory unit 150, the packet reader 133 can use the control information in the trailers 155a-c to read data out of the memory unit up to the point of the end of the packet so that it does not unnecessarily read the data of other packets that are to remain in the egress queue 44, as will be described in more detail below.

Note that various types of control information may be written to the trailers 155a-c. In one exemplary embodiment, when a trailer 155a-c is reached by the packet writer 115, the packet writer 115 writes into the trailer 155a-c (1) a byte count indicating the total number of bytes written to the memory unit 150 from the beginning of the memory unit 150 up to the end of the packet that is being written when the trailer 155 is reached and (2) a value, referred to as a "packet offset," indicating (e.g., pointing to) the next word offset after the end of the packet that is being written as the trailer 155a-c is reached. As an example, the packet offset stored in the trailer 155a-c may be the value of what the write offset will be when the packet writer 115 has completely written the packet to the memory unit 150. Thus, for the packet 165 spanning a trailer 155a in FIG. 10, such trailer 155a can be analyzed to find the end of the packet 165 in the memory unit 150.

As shown by FIG. 4, the queue manager 100 has egress state memory 141 that stores a respective value, referred to as a "read offset," for each egress queue 44. The read offset indicates the memory offset of the head memory unit of the egress queue 44 where data is to be read next. In this regard, the read offset generally indicates the next memory location after the last memory location from which data was most recently read. Thus, as data is read from a memory unit, the read offset is increased until the end of the memory unit is reached indicating that the memory unit has been completely read. When this occurs, the memory unit is deallocated, and the read offset is reset so that it effectively points to the beginning of the next memory unit from which data is to be pulled from the egress queue 44. When a memory unit is deallocated, it is effectively removed from the egress queue 44 so that it is available for allocation to another egress queue 44.

The egress state memory 141 also stores a value, referred to as a "read byte count," for each egress queue 44. The read byte count indicates the number of bytes that have been read from the associated egress queue 44. As an example, the read byte count may be incremented for each byte read from the egress queue 44 such that it represents a running sum of the number of bytes read. By comparing the read byte count stored in the egress state memory 141 for a particular egress queue 44 to the write byte count stored in the ingress state memory 111 for the same egress queue 44, the depth of the egress queue 44 can be calculated.

From time-to-time, the queue manager 100 receives requests, referred to as "pull requests," from the egress system 52 requesting that a certain amount of data be pulled from the queue system 40. Specifically, each pull requests identifies an egress queue and a value indicating an amount of data, such as an indicated number of bytes, to be pulled from the identified egress queue.

In response, the MMU 105 consults the queue state table 105 to determine which memory unit is the head of the identified egress queue 44. The MMU 105 passes the address of this memory unit and the read offset associated with such memory unit, as indicated by the egress state memory 141, to the packet reader 133. The packet reader 133 communicates with a memory system buffer 122 so that at least one packet is pulled from the identified memory unit starting at the memory location indicated by the read offset. As packet data is read from the memory unit, the packet reader 133 transmits such packet data to the egress system 52. After performing a read operation from a given memory unit, the packet reader 133 updates the read offset in the egress state memory 141 for the memory unit as appropriate so that the next read operation begins just after the end of the last read operation.

In order to enhance the efficiency of the system in performing the read operations, the packet reader 133 is configured to read whole packets out of the memory 42 regardless of the number of bytes that are requested. For example, assume that a scheduler 177 (FIG. 13) of the egress system 52 requests a certain number of bytes to be read from an egress queue 44. Also, assume that the packet reader 133 is reading a packet out of memory 42 and has yet to reach an end of the packet when the total number of bytes read for the operation reaches the number of bytes requested by the scheduler 177. Rather than stopping the read operation in the middle of the packet being read, the packet reader 133 is configured to continue reading the egress queue 44 until the end of the packet is reached. Thus, the next read operation may commence at the beginning of the next packet in the egress queue 44.

Note that maintaining control data in the queue manager 100 indicative of packet boundaries in the memory 42 for all of the memory units 50 can consume a significant amount of memory. In order to help reduce memory requirements, the queue manager 100 does not attempt to maintain control data in the integrated circuit 63 defining the packet boundaries in the memory 42. Instead, the packet reader 133 relies on the control information in the trailers 155, which are located between memory segments 152 in the memory 42, in order to find packet boundaries so that each read operation can be stopped at the end of a packet, as described above.

As an example, assume that the scheduler 177 requests that the queue manager 100 read x number of bytes from an egress queue 44 to which the memory unit 150 shown by FIG. 10 is allocated. Also, assume that the read offset stored in the egress state memory 141 points to the beginning of the packet 163. In such example, the packet reader 133 begins reading data from the beginning of the packet 163. The packet reader 133 continues reading the same memory unit 150 until the end of the memory unit 150 is reached or until x number of bytes have been read. If the end of the memory unit 150 is reached before x number of bytes are read, then the packet reader 133 begins reading the next memory unit of the same egress queue 44, as indicated by the allocation data 106 and as will be described in more detail below. However, for illustrative purposes, assume that the number of bytes read by the packet reader 133 reaches x while the packet reader 133 is reading the data packet 165 before the end of the packet 165 is reached. In such case, the packet reader 133 continues reading until the end of the packet 165 is reached at which point the current read operation is stopped.

In addition, the packet reader 133 uses the control information that is in the trailer 155a that is located between the beginning of the packet 165 and the end of the packet 165 in order to find the end of the packet 165. In this regard, once the beginning of such trailer 155a is reached, the packet reader 133 reads the trailer 155a, which as described above indicates memory location storing the end of the packet 165. Specifically, in one exemplary embodiment, the trailer 155a includes two values: a byte count and a packet offset, which as indicated above are written to the trailer 155 when the trailer 155 is reached as the packet 165 is being written. The byte counts indicates the total number of packet bytes that will have been written to the memory unit from the beginning of the memory unit up to the end of the packet being written when the trailer is reached by a write operation. That is, for the embodiment shown by FIG. 10, the byte count in the trailer 155a indicates the total number of bytes in the packets 163-165 written to the memory unit 150. The packet offset in a trailer indicates the memory location storing the end of the packet that is being written when the trailer is reached by a write operation. That is, for the embodiment shown by FIG. 10, the packet offset in the trailer 155a that is between portions of the packet 165 indicates the end of the packet 165.

As the packet 165 is being read, the byte count and the packet offset of the foregoing trailer 155a are passed to the packet reader 133 when the read operation reaches the trailer 155a. If the packet 165 is the last packet to be read for the current scheduler request, then the packet reader 133 uses the packet offset from the trailer 155a to stop the read operation at the end of the packet 165. Thus, the packet reader 133 ensures that the complete packet 165 is read without starting a read of the next packet 166. The packet reader 133 also updates the read offset in the egress state memory 141 for the memory unit 150 being read such that this read offset indicates the memory location storing the beginning of the next packet 166 to be read in the next read operation for the same memory unit 150. The packet reader 133 also uses the byte count from the trailer 155 to determine the total number of bytes read from the egress queue 44 for the current read operation. The packet reader 133 then updates the read byte count that is stored in the egress state memory 141. Thus, the updated egress byte count should reflect the number of bytes that have been read from the associated memory unit 150 by the end of the read operation, and the MMU 101 can determine the depth of the egress queue 44 by comparing the read byte count for the egress queue 44 in the egress state memory 141 to the write byte count for the same egress queue 44 in the ingress state memory 111.

If the end of a memory unit is reached during a read operation, the packet reader 133 communicates with the queue manager 100 to request deallocation of such memory so that the memory unit is freed for use for other egress queues 44. In response, the MMU 101 deallocates the memory unit. Specifically, the MMU 101 consults the allocation data 106 to determine the next memory unit of the queue buffer 44 from which the read operation occurred. For example, referring to FIG. 5, assume that memory unit "0" is being deallocated. The MMU 101 consults the allocation data 106 to determine that the entry representing memory unit "0" points to memory unit "3." Accordingly, the MMU 101 updates the head pointer for the corresponding egress queue 44 in the allocation data 105 to point to this next memory unit "3," as shown by FIG. 11. The MMU 101 also decrements the queue depth indicator to indicate that there are now only three memory units allocated to the egress queue 44, as shown by FIG. 11. The MMU 101 may also update the pointer of the entry representing memory unit "0" to indicate that memory unit "0" is available for allocation, as shown by FIG. 12.

Figure 13:
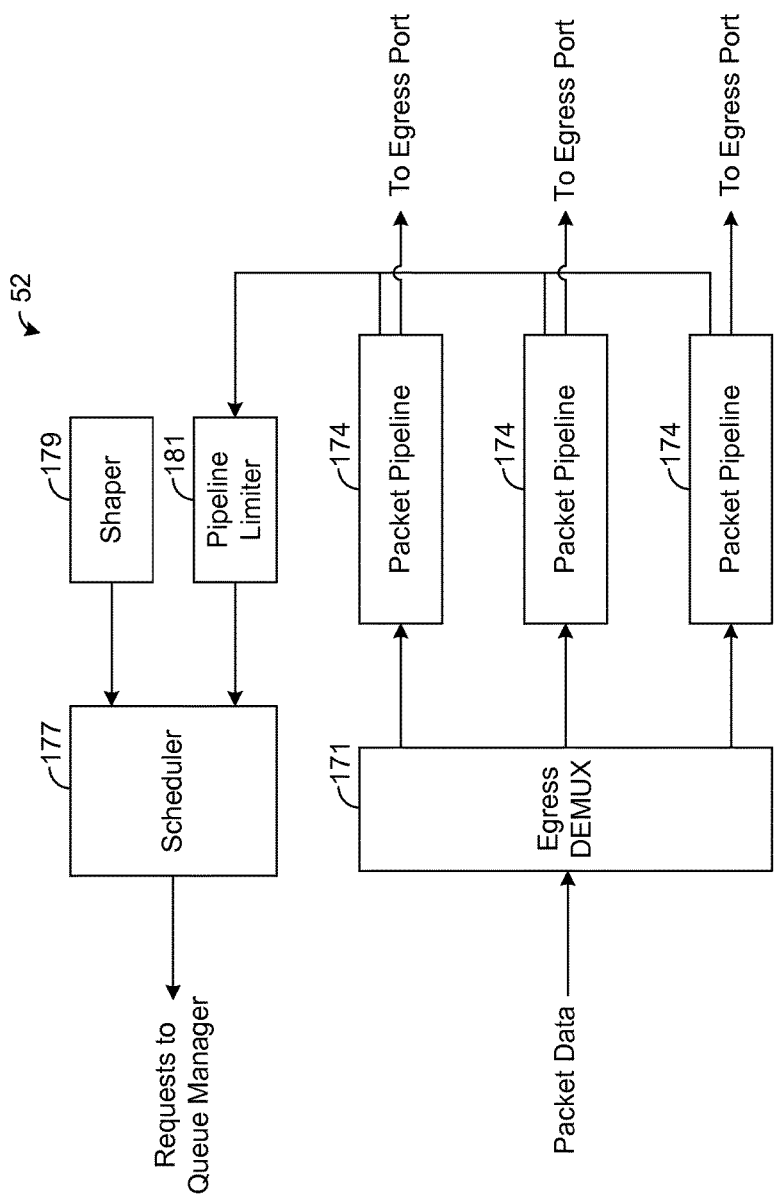
FIG. 13 is a block diagram illustrating an exemplary embodiment of an egress system, such as is depicted by FIG. 1.

An exemplary embodiment of the egress system 52 is depicted by FIG. 13. As shown by FIG. 13, the egress system 52 comprises an egress demultiplexer (DEMUX) 171 that is configured to receive data packets pulled from the queue system 40 and to demultiplex the stream of data packets so that each packet is input into an egress pipeline that is coupled to the appropriate egress port 33 for the packet's egress from the switch 15. The egress pipeline 174 is configured to perform various editing of the packet prior to its egress from the switch 15, as is known in the art.

As shown by FIG. 13, the egress system 52 also comprises a scheduler 177 that is configured to send pull requests to the queue system 40. In this regard, using input from a shaper 179 and a pipeline limiter 181, the scheduler 177 is configured to select egress queues from which packets are to be pulled for egress from the switch 15. The shaper 179 is provisioned with knowledge about the packet flows, such as priorities and service level guarantees, and such information is used to help make scheduling decisions during periods of congestion. The pipeline limiter 181 monitors the amount of packets that flow out of the pipelines 174 relative to the number of packets that flow into the pipelines 174 in order to limit the total amount of outstanding data requested from the queue system 40 so that data overruns do not occur in the pipelines 174.

In one exemplary embodiment, certain packets (referred to hereafter as "jumbo packets") are queued differently than the other packets received by the switch 15. As an example, the MMU 101 may determine that a packet is a jumbo packet if the length of the packet exceeds a predefined threshold. The MMU 101 may also classify multicast packets as jumbo packets, noting that multicast packets are typically forwarded to a large number of ports and, thus, stored in a large number of egress queues 44 if they are processed in the same manner as other types of packets. In other embodiments, other types of packets may be classified as jumbo packets. Generally, as used herein, a "jumbo packet" refers to a packet that, if stored in the egress queues 44 in the same manner as other packets, would consume a large amount of storage space in egress queues 44 relative to the average packet size of the traffic received by the switch 15. As such, it may be more efficient or desirable to buffer jumbo packets differently.

Referring to FIG. 1, at least one queue 190, referred to hereafter as "jumbo queue," is used for storing jumbo packets. The jumbo queue 190 is implemented as a circular buffer that is permanently allocated for storing jumbo packets. That is, unlike the egress queues 44, the size or depth of the jumbo queue 190 is not dynamically changed but is instead static. The jumbo queue 190 has a predefined depth that is sufficiently large to accommodate all of the jumbo packets that are expected to be simultaneously stored to the jumbo queue 190 for the switch 15. In other embodiments, the other types of jumbo queues 190 are possible.

When the queue system 40 (FIG. 4) receives a jumbo packet, the MMU 101 causes the jumbo packet to be written into the jumbo queue 190. For each egress queue 44 identified by the attribute data of the jumbo packet, the MMU 101 causes a pointer to the jumbo packet to be written to such egress queue 44 instead of the jumbo packet itself. That is, according to the techniques described above, the MMU 101 allocates sufficient memory in the egress queue 44 for storing the pointer and requests that the packet writer 155 writes the pointer to such egress queue 44. Since the pointer instead of the jumbo packet is written to the egress queue 44, the size of the egress queue 44 is kept smaller than would otherwise be the case if the jumbo packet is stored to the egress queue 44 in the same manner as other packets described above. Later, when the jumbo packet is to be read from the queue system 40, the packet reader 133 pulls the pointer from the egress queue 44 and then uses the pointer to read the jumbo packet from the jumbo queue 190.

Figures 14, 15:
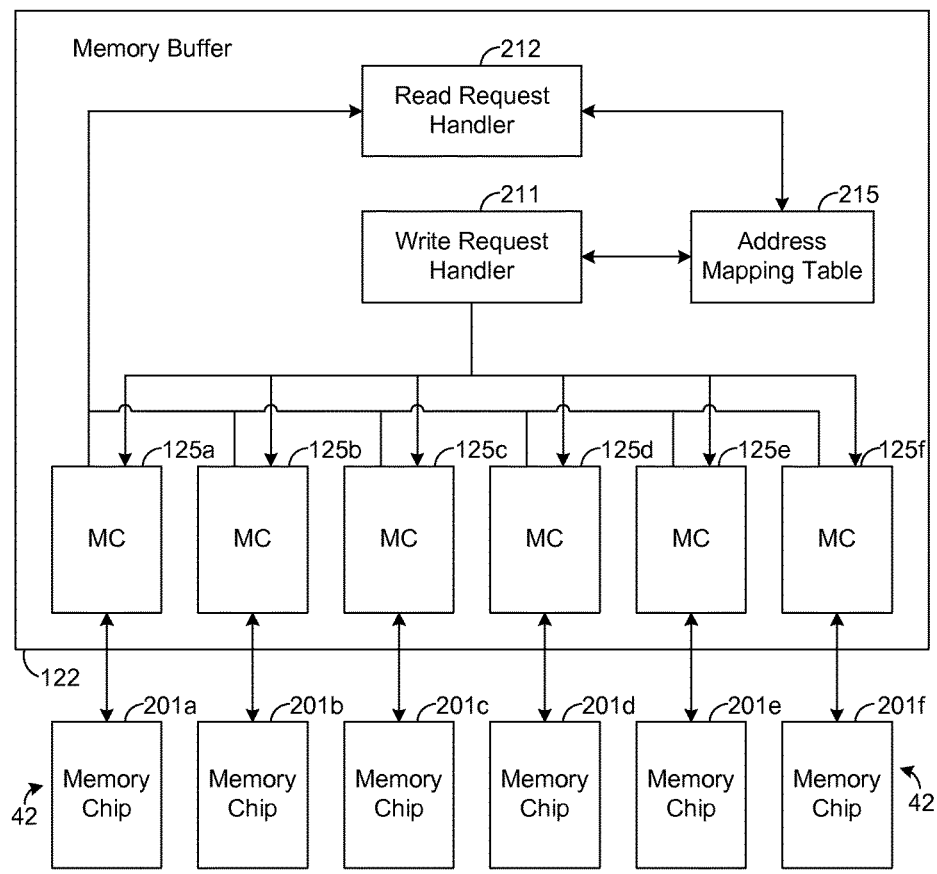
FIG. 14 is a block diagram illustrating an exemplary embodiment of a memory buffer and memory, such as is depicted by FIGS. 1 and 4.
FIG. 15 is a table illustrating exemplary mappings of physical addresses to memory chips, such as is depicted by FIG. 14.

FIG. 14 depicts an exemplary embodiment of the memory buffer 122 and the memory 42. As shown by FIG. 14, the memory 42 comprises a plurality of memory chips 201a-f that are respectively coupled to a plurality of memory controllers 125a-f. Each memory chip 201a-f and memory controller (MC) 125a-f is implemented as an integrated circuit (IC) or "chip" having a plurality of external pins (not specifically shown) for making electrical contact with conductive traces that run between the integrated circuits. In one exemplary embodiment, each memory chip 201a-f is a DRAM chip, but other types of memory chips may be used in other embodiments. In addition, FIG. 14 shows six memory controllers 125a-f coupled to six memory chips 201a-f, but it is possible for any number of memory controllers and memory chips to be used in other embodiments. In addition, a single memory controller may be coupled to and control multiple memory chips, if desired.

Note that each memory chip 201a-f is configured to process data at a certain speed, referred to herein as "chip processing speed," depending on the type of hardware associated with the memory chip and the memory controller that controls such memory chip. Specifically, the chip processing speed for a given memory chip refers to the speed at which data can be written to or read from the memory chip. This speed can be limited by a number of factors, such as the size of the bus that connects the memory chip to its corresponding memory controller and the speed of the clock signals used by the memory chip and its corresponding memory controller. If the same clock signal is used by all of the memory chips 201a-f and the memory controllers 125a-125e, then it is possible that all of the memory chips 201a-f have the same chip processing speed, assuming equal bus sizes. However, in some cases, the memory controller for one memory chip may have a different number of pins to which the memory chip is coupled than the memory controller for another memory chip. That is, the bus size for one memory chip may be different than the bus size for another memory chip. In such case, the memory chips may have different chip processing speeds even if they are all clocked by the same clock signal. Specifically, the memory chip having the greater bus size (i.e., coupled to a higher number of memory controller pins) should have a higher chip processing speed. For illustrative purposes, unless otherwise indicated, it will be assumed hereafter that (1) the chip processing speeds of memory chips 201a, 201b, 201e, and 201f are equal, (2) the chip processing speeds of memory chips 201c and 201d are equal, and (3) the chip processing speed of each of the memory chips 201c and 201d is twice as fast as the chip processing speed of each of the memory chips 201a, 201b, 201e, and 201f. In other examples, other chip processing speeds for any of the memory chips 210a-f are possible.

As shown by FIG. 14, the memory buffer 122 comprises a write request handler 211 that receives write requests from the packet writer 115 (FIG. 4). As described above, each write request includes an address identifying a memory location to which data is to be written. The memory addresses used by the packet writer 115 and packet reader 133, as well as the queue manager 100, are in a first domain that is different than the domain used by the memory controllers 125a-f. The addresses used by the packet writer 115, packet reader 133, and queue manager 100 shall be referred to hereafter as "virtual addresses." Each virtual address essentially identifies a virtual memory location for the packet data that is stored in the memory 42.

The write request handler 211 is configured to use an address mapping table 215 in order to translate the virtual addresses from write requests into memory addresses, referred to herein as "physical addresses," that are in the domain used by the memory controllers 125a-f, and the physical addresses, therefore, identify physical memory locations in the memory chips 201a-f. Such address mapping table 215 has a plurality of mappings, and each mapping maps a respective virtual address to its corresponding physical address. When the write request handler 211 receives a write request, the write request handler 211 translates the virtual address of the write request into at least one physical address that can be used by at least one memory controller 125 to write data into at least one memory chip 201a-f.

The memory buffer 122 also comprises a read request handler 212 that receives read requests from the packet reader 133 (FIG. 4). As described above, each read request includes a virtual address identifying a memory location from which data is to be read. When the read request handler 212 receives a read request, the read request handler 211 translates the virtual address of the read request into at least one physical address that can be used by at least one memory controller 125a-f to read data from at least one memory chip 201a-f.

In one exemplary embodiment, each memory location identified by a physical address has a length of 128 bytes, which is smaller than the size of a segment 152 (FIG. 9), but other sizes of the physical memory locations are possible in other embodiments. In addition, the address mapping table 215 may be defined such that the amount of data written to each memory chip 201a-f for a given write request is substantially proportional to the chip processing speed of the memory chip relative to the chip processing speeds of the other memory chips. Thus, for a given write request, more data is generally written to a memory chip 201a-f having a higher chip processing speed than a memory chip having a lower chip processing speed. Further, approximately the same amount of data is generally written to memory chips 201a-f having the same chip processing speeds.

By ensuring that amount of data written to each memory chip 201a-f is substantially proportional to its chip processing speed helps to distribute the processing burden of a write request across the memory controllers 125a-f such that each memory controller 125a-f remains busy writing data for approximately the same amount of time. That is, the mappings of the address mapping table 215 are defined such that the load of the write operation is balanced across the memory controllers 125a-f taking into account the disparate chip processing speeds that exist. Such load balancing helps to enhance the efficiency of the memory buffer 122 in performing write operations by reducing the amount of time that a given memory controller 125a-f remains idle. Similarly, when data is read from the memory chips 201a-f for a given read request, each memory controller 125a-f should remain busy reading for approximately the same amount of time, thereby increasing the efficiency of the memory buffer 122 in performing read operations. That is, the mappings of the address mapping table 215 are defined such that the load of the read operation is balanced across the memory controllers 125a-f taking into account the disparate chip processing speeds that exist.

Note that the term "substantially proportional" recognizes that precise proportionality within a memory system is not achievable in some instances depending on the amount of data that needs to be stored in view of the granularity of the sizes of the physical memory locations. As an example, if there are six memory chips having memory locations segmented into sizes of 128 bytes per memory location, then one of the memory chips 201a-f may receive an extra 128 bytes if there are 896 bytes (i.e., 128 bytes×7) to write even if all of six chips have the same chip processing speed. Nevertheless, by attempting to maintain proportionality for each write request as much as is practicable, the amount of data written to each memory chip 201a-f over a large number of write requests should also be substantially proportional to its chip processing speed relative to the chip processing speeds of the other memory chips.

In one exemplary embodiment, physical addresses for consecutive virtual addresses are generally mapped consecutively across the memory chips 201a-f except that additional physical addresses are mapped to memory chips having greater chip processing speeds so that the substantial proportionality described above is achieved. As an example, as described above, assume that each memory chip 201c and 201d has a chip processing speed twice as fast as the chip processing speed for each of the memory chips 201a, 201b, 201e, and 201f. Further assume that the address mapping table 215 is defined such that one or more consecutive virtual addresses are mapped to eight physical addresses, referred to as Physical Addresses 1-8. FIG. 15 shows a table of how the Physical Addresses 1-8 may be distributed across the memory chips 201a-f. Specifically, the first Physical Address 1 identifies a memory location in the memory chip 201a. Further, the next three Physical Addresses 2-4 identify memory locations in memory chips 201b-201d, respectively, and the next four Physical Addresses 5-8 identify memory locations in memory chips 201c-201f, respectively.

If each physical memory location is 128 bytes and if the write request handler 211 receives a write request that has 1024 bytes to be written to memory 42, the first 128-byte word may be written to memory chip 201a. The next three consecutive 128-byte words may be written to memory chips 201b, 201c, and 201d, respectively, and the next four 128-byte words may be written to memory chips 201c, 201d, 201e, and 201f, respectively. Thus, twice as much data from the write request is written to each of the memory chips 201c and 201d relative to the amount of data written to each of the memory chips 201a, 201b, 201e, and 201f. However, since the chip processing speed for each of the memory chips 201c and 201d is twice as fast as the chip processing speed for each of the memory chips 201a, 201b, 201e, and 201f, all of the memory controllers 125a-f may be simultaneously writing during the write operation with none of the memory controllers 125a-f being idle. That is, each of the memory controllers 125a-f should be busy writing for approximately the same amount of time.

Note that, if it is assumed that there is more than 1024 bytes of data in the write request, then the first 1024 bytes of data may be written as described above, and the next 1024 bytes of data may be written in the same manner. That is, the table 215 may be defined such that data is written across the memory chips 201a-201f in the manner described above until all of the data from the write request is written. The next write operation may then commence from the point that the last write operation completed. Accordingly, over time, the amount of data written to each memory chip 201a-f should be substantially proportional to the chip processing speed of the memory chip relative to the chip processing speeds of the other memory chips.

It should be noted that each iteration of the mappings across the memory chips 201a-f does not have to be the same. For example, assume that the chip processing speed of each memory chip 201c and 201d is 33% faster than the chip processing speed of each memory chip 201a, 201b, 201e, and 201f. In such case, the first 8 physical addresses may be mapped across the memory chips 201a-f as described above in which twice as much data is written to the memory chips 201c and 201d, then the next 12 physical addresses, however, may be mapped across the memory chips 201a-f equally such that two physical addresses are mapped to each respective memory chip 201a-f. That is, the 12 physical addresses are mapped such that the same amount of data is written to each memory chip 201a-f. Thus, the 20 total physical addresses are mapped such that 33% more data is written to the memory chips 201c and 201d. This same pattern may be used for the next 20 physical addresses, and this pattern may be continuously repeated. In such case, about 33% more physical addresses should be mapped to each of the memory chips 201c and 201d relative to the number of physical addresses mapped to each of the memory chips 201a, 201b, 201e, and 201f. In other embodiments, other algorithms for mapping the physical addresses are possible.

Referring to FIG. 3, it is possible for any of the forwarding tables 84 to store a large amount of data, particularly for switches that have a large number of ports and process a large amount of traffic. As the size of a forwarding table 84 increases, the time required to search the table 84 to find information of interest may increase resulting in processing delays within the switch 15. In one exemplary embodiment, a memory system 85 for storing a forwarding table 84 is implemented using a plurality of memory stages where the final memory stage comprises the entire forwarding table 84, and the other stages comprise copies of portions of the forwarding table 84. An entry of interest in the forwarding table 84 is found by searching the memory stages in succession such that by the time the final stage is reached, the entry of interest is identified so that data in the entry can be accessed without having to search among all of the entries of the forwarding table 84. Thus, the circuitry for searching the forwarding table 84 is divided into stages so that each stage can be simultaneously processing one read operation while the other stages are processing other read operations thereby reducing the overall delay required to perform the read operations.

Figure 16:
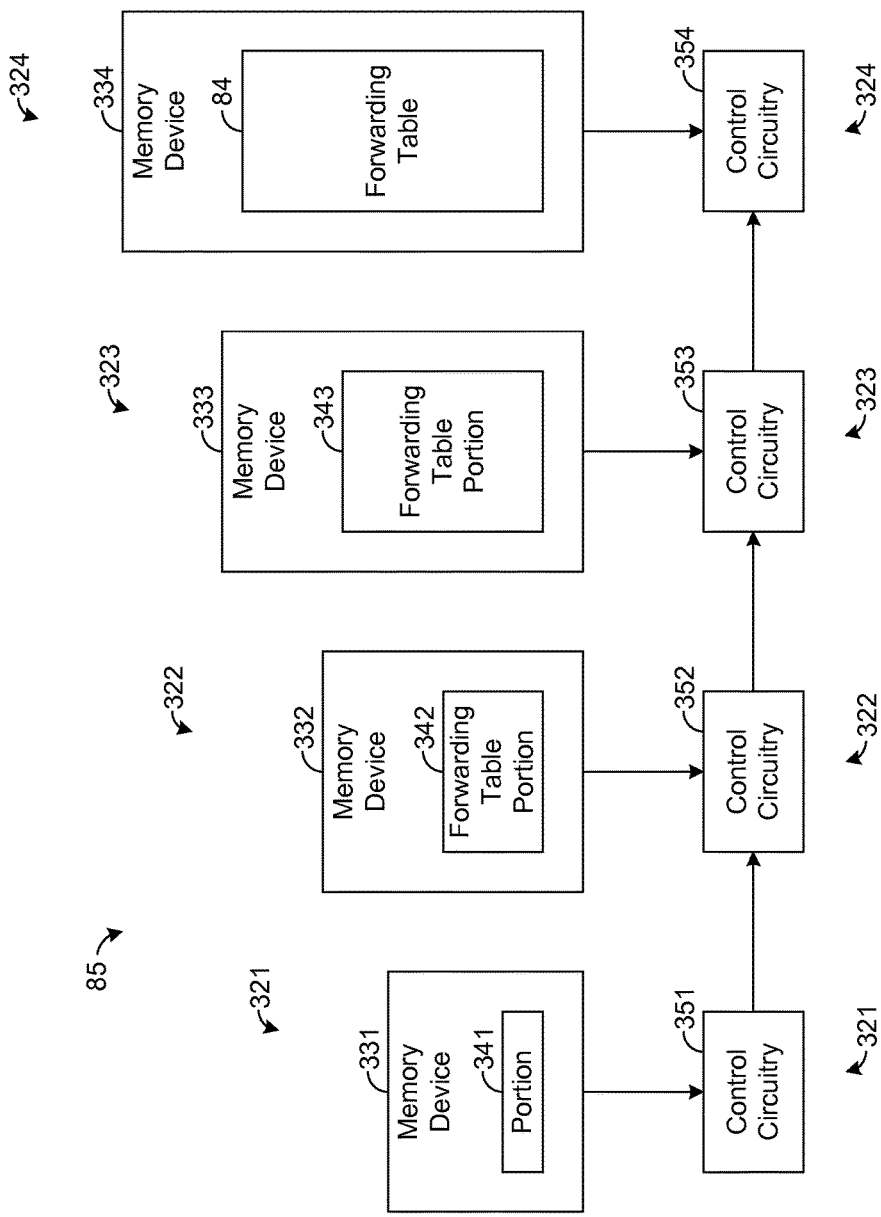
FIG. 16 is a block diagram illustrating an exemplary embodiment of a memory system, such as is depicted by FIG. 3.

FIG. 16 depicts an exemplary embodiment of a memory system 311 that can be used to store a forwarding table 84 and to efficiently search for and read an entry of interest in the forwarding table 84. As shown by FIG. 16, the system 311 comprises a plurality of memory stages 321-324 where each memory stage 321-324 stores at least a portion of a forwarding table 84. Specifically, the memory stage 324 comprises a memory device 334 that stores the entire forwarding table 84. As an example, the forwarding table 84 may have a plurality of entries in which each entry maps a key to a set of data. As an example, the forwarding table 334 may map an identifier, referred to herein as "path identifier," such as a MAC address or a VLAN tag, to at least one port identifier or other information indicating to which port or ports a packet is to be forwarded. For illustrative purposes, the table 334 will be described hereafter as mapping path identifiers to port identifiers, but it should be emphasized that the table 334 may map other types of keys to other types of data in other embodiments.

As described above, if the path identifier of an entry in the forwarding table 84 matches attribute data (e.g., MAC address or VLAN tag) of a received packet, then the forwarding logic 82 controls the attribute data such that the packet is forwarded to the port or ports identified by such entry. In other embodiments, various other types of forwarding tables are possible.

As shown by FIG. 16, the memory stage 323 comprises a memory device 333 that stores a portion 343 of the forwarding table 84. As an example, the portion 343 may include a plurality of entries storing path identifiers of select entries of the forwarding table 84. Thus, the size of the portion 343 in the stage 323 is smaller than the forwarding table 84 that is stored in the stage 324.

Similarly, the memory stage 322 comprises a memory device 332 that stores a portion 342 of the forwarding table 84. As an example, the portion 342 may include a plurality of entries storing path identifiers of select entries of the forwarding table 84. The size of the portion 342 in the stage 322 is smaller than the size of the portion 343 in the stage 323.

In addition, the memory stage 321 comprises a memory device 331 that stores a portion 341 of the forwarding table 84. As an example, the portion 341 may include at least one entry storing a path identifier of a select entry of the forwarding table 84. The size of the portion 341 in the stage 321 is smaller than the size of the portion 342 in the stage 322.

In one exemplary embodiment, each of the memory devices 331-334 is implemented as static random access memory within the FPGA 63 (FIG. 1). As an example, the memory devices 331-333 may be distributed RAM, and the memory device 334 may be block RAM. In other embodiments, other types of memory are possible for any of the memory devices 331-334. In addition, for simplicity of illustration, the exemplary embodiment shown by FIG. 16 has four stages 321-324, but the system 311 may have any number of stages in other embodiments.

As shown by FIG. 16, each of the memory devices 331-334 is coupled to control circuitry 351-354, respectively. Each set of control circuitry 351-354 is configured to receive a path identifier, referred to as the "path identifier of interest," and to compare the path identifier of interest to at least one path identifier stored in its corresponding memory device 331-334 to determine whether the path identifier of interest is equal to, less than, or greater than the stored path identifier. Through such comparisons, the control circuitry 351-354 stage-by-stage narrows the range of entries in which the receive path identifier may be stored such that when the path identifier of interest reaches the final stage 324, the control circuitry 354 is aware of which entry it must be stored if such path identifier is stored in the forwarding table 354. If the path identifier of interest indeed matches the one in the foregoing entry, the control circuitry 354 retrieves data (e.g., at least one port identifier) from such entry and provides the retrieved data to the forwarding logic 82 (FIG. 3), which then uses the data to make a forwarding decision for the packet from which the path identifier of interest was received. If the path identifier of interest is not in the identified entry, then the control circuitry 354 reports a forwarding-table miss to the forwarding logic 82, which may be responsive to such miss for taking various actions, such as requesting a search of another forwarding table, making a decision to flood the packet to a plurality of ports, or marking the associated packet for exception.

Note that various types of search algorithms may be used by the stages 321-324. In one exemplary embodiment, each stage 321-324 uses a half-interval search algorithm in order to search the list of entries in which a path identifier may be found. In this regard, the path identifiers in the forwarding table 84 (which are used as keys to find the entry of interest)

are sorted in ascending or descending order. The memory device 331 of the first stage 321 stores the path identifier of the entry at the midpoint of the forwarding table 84 (i.e., the entry halfway between the beginning and end of the forwarding table 84), and the control circuitry 351 is configured to compare the path identifier of interest to the one stored in the memory device 331 in order to determine whether the path identifier of interest is in the upper half or lower half of the forwarding table 84. Thus, the stage 321 narrows the range of possible entries to half of the total entries in the forwarding table 84. The result of this analysis is passed to the control circuitry 352, which then performs a similar half-interval search algorithm on the range of possible entries indicated by the result of the analysis performed by the control circuitry 351, thereby reducing the range of possible entries to one-quarter (i.e., half of the range indicated by the previous stage 321) of the total entries in the forwarding table 84. This process continues stage-by-stage, further narrowing the range of possible entries, until the path identifier of interest is found in the memory devices 331-333 or until the range of possible entries is reduced to one. Thus, the number of stages 321-324 may be based on the size of the forwarding table 84 such that the result of the half-interval search algorithm performed by the penultimate stage 323 reduces the range of possible entries to one, assuming that a hit is not found by a stage prior to the last stage. At this point, the control circuitry 354 can analyze this one entry to determine whether there is a forwarding-table hit or miss.

Note that, in the instant embodiment, only memory device 334 of the last stage 324 stores the full forwarding table 84. The memory devices 331-333 store select ones of the path identifiers without necessarily storing the data that is associated with such path identifiers. In addition, in one exemplary embodiment, each stage 331-333 preferably stores only the entries that are possibly used by the stage 331-333. As an example, the memory device 331 of the first stage 321 may have a single entry that stores the path identifier of the entry at the midpoint of the forwarding table 84, noting that this entry is the only one used by the first stage 321. Further, the memory device 332 of the second stage 322 may have two entries: one at the midpoint of the upper half of entries and the other at the midpoint of the lower half of entries. In such embodiment, each successive stage preferably stores twice as many entries as the previous stage. Note that, in other embodiments, other configurations of the stages 321-324 are possible. In particular, it is possible for any of the stages 321-324 to store any number of entries of the forwarding table 84. Limiting the number of the entries stored in the stages 331-333, as described above, helps to reduce the memory requirements for implementing the memory devices 331-334.

In the exemplary embodiment described above, each stage 321-324 essentially performs an iteration of the half-interval search algorithm that is implemented by the control circuitry 351-354. However, separating the iterations into various stages allows one stage to perform an iteration of the search algorithm for the path identifier of one packet while another stage simultaneously perform an iteration of the search algorithm for the path identifier of another packet. Indeed, in an embodiment that has four stages 321-324, as shown by FIG. 16, it is possible for the memory system 85 to simultaneously process four path identifiers from four different packets where each stage 321-324 simultaneously processes a respective path identifier. Furthermore, in other embodiments, it is possible for each stage to be segmented (or "pipelined") into independent sub-stages, and each sub-stage can simultaneously process an independent packet, leading to a plurality of searches performed per stage. Since the search for one path identifier may commence before the search of another path identifier completes, the memory system 85 is able to perform more searches in a given time period relative to an embodiment that must complete a search of a forwarding table 84 for one path identifier before commencing a search of the forwarding table 84 for another path identifier.

To better illustrate various aspects described above, refer to FIG. 17, which shows an exemplary forwarding table 84 having sixteen entries. In other embodiments, the forwarding table 84 may have other numbers of entries. As shown by FIG. 17, each entry is associated with an address that identifies the memory location where the entry resides in memory. Each entry also has a path identifier that is used as a key to find the entry of interest. Each entry also has a data field that includes information, such as at least one port identifier, mapped to the path identifier that is in the same entry. As shown by FIG. 17, the entries are sorted such that the path identifiers are in ascending order.

For such an exemplary forwarding table 84, FIGS. 18-20 show the portions 341-343 stored in the memory devices 331-333, respectively. Specifically, the portion 341 includes the entry at address 1000, the portion 342 includes the entries at addresses 0100 and 1100, and the portion 343 includes the entries at addresses 0010, 0110, 1010, and 1110. Note that it is unnecessary for the portions 341-343 to include the data fields of the entries stored therein.

For illustrative purposes, assume that the forwarding logic 82 (FIG. 3) transmits to the memory system 85 a search request requesting the memory system 85 to search the forwarding table 84 for a path identifier of interest that is included in the search request. As an example, assume that the path identifier of interest is "8," which is stored in the entry at address 0011 of the forwarding table 84.

In the instant example, the control circuitry 351 receives the path identifier of interest and compares this path identifier to the one (i.e., "25") stored in the memory device 331 in order to determine whether the path identifier of interest is equal to, less than, or greater than the one stored in the entry at address 1000. In such example, the path identifier of interest is less than the one stored at address 1000 such that the control circuitry 351 determines that the path identifier of interest is likely stored in the half of entries from address 0000 to address 0111. That is, since the path identifier of interest is less than the one to which it is compared, the control circuitry 351 determines that the most significant bit of the address likely storing the path identifier of interest is "0." The control circuitry 351 of the first stage 321 is configured to transmit this value (i.e., the most significant bit of the address for the entry likely storing the path identifier of interest) and the path identifier of interest to the control circuitry 352 of the second stage 322.

The control circuitry 352 uses the foregoing value received from the first stage 321 in order to determine which entry in the memory device 332 is to be compared to the path identifier of interest. Specifically, the control circuitry 352 compares the path identifier of interest to the path identifier in the entry that is within the range of possible entries indicated by the control circuitry 351 of the first stage 321. That is, the control circuitry 352 compares the path identifier of interest to the one in the entry at the address having a most significant bit that matches the one received from the first stage 321. In the instant example, the path identifier of interest (i.e., "8") is less than the one (i.e., "11") stored at the identified address 0100 such that the control circuitry 352 determines that the path identifier of interest is likely stored in the quadrant of entries from address 0000 to address 0011. That is, since the path identifier of interest is less than the one to which it is compared, the control circuitry 352 determines that the next most significant bit of the address likely storing the path identifier of interest is "0." Thus, the two most significant bits of the address storing the path identifier of interest, as determined by the control circuitry 351 and 352, are "00." The control circuitry 352 of the second stage 322 is configured to transmit this value (i.e., the two most significant bits of the address for the entry likely storing the path identifier of interest) and the path identifier of interest to the control circuitry 353 of the third stage 323.

The control circuitry 353 uses the foregoing value received from the second stage 322 in order to determine which entry in the memory device 333 is to be compared to the path identifier of interest. Specifically, the control circuitry 353 compares the path identifier of interest to the path identifier in the entry that is within the range of possible entries indicated by the control circuitry 352 of the second stage 322. That is, the control circuitry 353 compares the path identifier of interest to the one in the entry at the address having the two most significant bits that match the ones received from the second stage 322. In the instant example, the path identifier of interest (i.e., "8") is greater than the one (i.e., "7") stored at the identified address 0010 such that the control circuitry 353 determines that the next most significant bit is a "1." Thus, the three most significant bits of the address likely storing the path identifier of interest, as determined by the control circuitry 351, 352, and 353, are "001." The control circuitry 353 of the third stage 323 is configured to transmit this value (i.e., the three most significant bits of the address for entry likely storing the path identifier of interest) and the path identifier of interest to the control circuitry 354 of the fourth stage 324.

The control circuitry 354 is configured to compare the path identifier of interest to two entries stored at the address received from the control circuitry 353. If the path identifier matches one of the entries, the control circuitry 354 determines that there is a hit and retrieves the information in the data field at the identified address 0011. The control circuitry 354 provides such data to the forwarding logic 82, which forwards the associated packet based on such information. If the path identifier at address 0011 does not match the path identifier of interest, the control circuitry 354 determines that a miss occurred and reports the miss to the forwarding logic 82. It is also possible that an exact match is not required, in case the path identifier is within a range of values that pertain to the nearest entry. In such a case, the data field at the identified address may contain information about a valid range of path identifiers that correspond to a match of that entry. By allowing this range matching, fewer entries are required to perform such searches (for example, the well-known longest prefix match search for internet protocol subnet addresses).

FIG. 21 shows an exemplary structure of the forwarding table 84 stored in the final stage 324 for the example described above. Each row of the table 84 in FIG. 21 is associated with the three most significant bits of a respective forwarding-table address. Thus, the table 84 lists all possible three-bit addresses that may be received from the previous stage 323. Each row also has the path identifiers stored at the addresses that correspond to the row's three-bit address, as well as the data (e.g., port identifiers) that are associated with such path identifiers. As an example, the three-bit address "001" may correspond to the forwarding-table address "0010" (when the least significant bit (LSB) is a "0"

and to forwarding-table address "0011" (when the LSB is a "1"). Thus, the row having the three-bit address "001" also includes the path identifiers (i.e., "7" and "8") respectively stored at addresses "0010" and "0011," as well as the port identifiers (i.e., "3" and "4") associated with such path identifiers.

When the control circuitry 324 receives a three-bit address from the stage 323, the control circuitry 324 compares the path identifier of interest to the path identifiers in the row corresponding to the three-bit address. If a match is found, the data associated with the matching path identifier is retrieved. As an example, in the embodiment described above where the control circuitry 324 receives the three-bit address "001" from the stage 323 and where the path identifier of interest is "8," the control circuitry determines, based on the table 84 shown by FIG. 21, that the least significant bit of the entry associated with the path identifier of interest is "1." Thus, the control circuitry 324 detects a forwarding-table hit and retrieves the port identifier stored at address "0011."

As illustrated above, each stage 321-323 performs a half-interval search algorithm or some other desired search algorithm in order to determine a respective portion of the address that should be storing the path identifier of interest assuming that the path identifier of interest is, in fact, stored in the forwarding table 84. In the embodiment described above where there are sixteen total entries in the forwarding table 84, each stage determines one respective bit of the address. However, when there are more entries compared at each stage (utilizing a separate storage element and comparison element per entry), each stage may determine more than one bit of the address storing the path identifier of interest. Each stage passes the known portion of such address to the next stage until the complete address is known. The number of entry comparisons in each stage may be $2^b-1$, where b is the number of bits determined by that stage toward the address of the entry in the final stage, although other numbers of entry comparisons per stage are possible. When the complete address is known, the control circuitry 354 of the last stage 324 determines whether the path identifier of interest is in fact stored at the identified address. If so, a hit occurs, and information from the data field at the identified address is returned to the forwarding logic 82. Otherwise, a miss occurs at which point the forwarding logic 82 may request another forwarding table to be searched or take some other action as may be desired.

In the example described above, the search at each stage is essentially binary where the possible range of entries at each stage is split into two parts and, thus, each stage determines a single bit of the forwarding-table address. However, it is possible for the range to be split into any number of parts and for each stage to determine any number of bits for the forwarding-table address. As an example, FIG. 23 shows an exemplary structure of the forwarding table 84 stored in the final stage for an embodiment in which each stage performs a quaternary search by determining two bits of the forwarding-table address by performing twice as many comparisons as described above for a binary search (thereby reducing the total number of stages in the memory system 311). Note that the corresponding data (e.g., port identifiers) are omitted from FIG. 23 for simplicity of illustration. In such an embodiment, the control circuitry of the final stage receives a two-bit address (representing the two most significant bits of the forwarding-table address possibly storing the path identifier of interest) from the previous stage and compares the path identifier of interest to the path identifiers in the row associated with the two-bit address. If there is a match, the control circuitry detects a forwarding-table hit and retrieves the matching path identifier. If there is not a match, the control circuitry detects forwarding-table miss.

Figure 22:
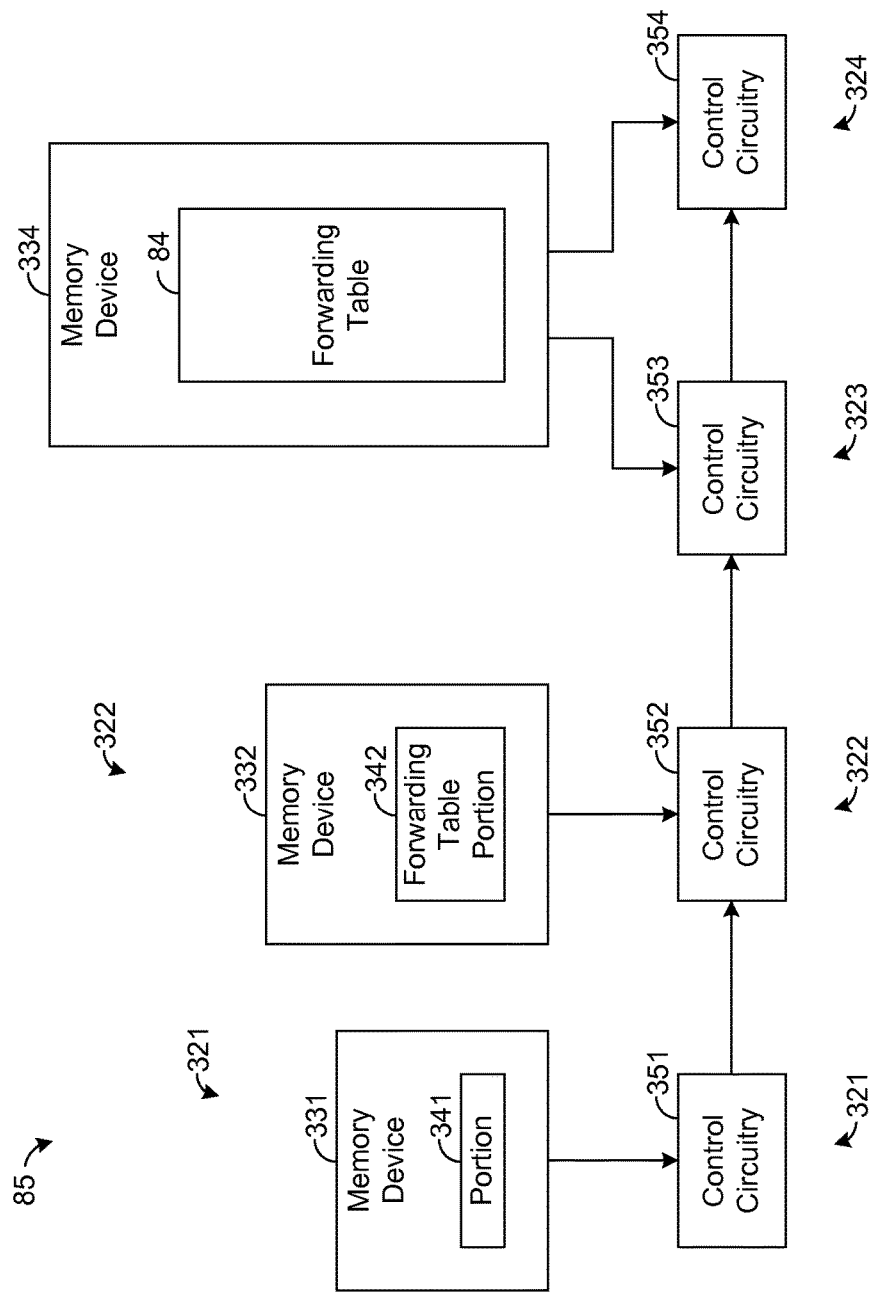
FIG. 22 is a block diagram illustrating an exemplary embodiment of a memory system, such as is depicted by FIG. 3.

In addition, as indicated above, various configurations of the memory devices 331-334 are possible. In one exemplary embodiment, each memory device 331-334 is implemented as a single-port memory device such that, at any given time, a single read operation or write operation can be performed. If a multi-port memory device is used instead, then it is possible for one or more memory devices 331-334 to be consolidated to a single memory device. As an example, FIG. 22 shows an exemplary embodiment that is essentially the same as the embodiment shown by FIG. 16 except that the memory device 334 is implemented as a dual-port memory device for which two read or write operations can be simultaneously performed on the memory device 334. In such case, the control circuitry 353 and 354 may both simultaneously perform read operations on the forwarding table 84. Thus, there is no need to have a separate memory device 333, as is shown by FIG. 16. In addition, since the portion 333 in FIG. 16 is redundant to the information in the forwarding table 84, the control circuitry 353 may use the forwarding table 84 to perform the same comparisons described above for the embodiment shown by FIG. 16. If desired, multi-port memory devices may be used to consolidate memory devices of other stages in a similar manner.

In various embodiments described above, the memory system 311 is described in the context of storing information, such as path identifiers and port identifiers in a forwarding table. However, similar techniques may be used to store and search for other types of information. In other embodiments, other types of tables may be implemented using a plurality of stages, as described above. Rather than having path identifiers mapped to port identifiers, as described above, such tables may have other types of keys mapped to other types of data. In such embodiments, the memory system 311 may search for a key stage-by-stage, as described above for the path identifiers, in order to find data of interest that is associated with the key being sought. It is unnecessary for the memory system 311 to be used within the context of a network switch.

Now, therefore, the following is claimed:

1. An apparatus, comprising:
   circuitry for receiving a first read request for reading an entry of table stored by the apparatus, the table having a plurality of entries, wherein each of the plurality of entries has a respective key and data mapped to the key, and wherein the first read request has a first key;
   a plurality of memory stages configured to process the first read request serially, the plurality of memory stages including at least a first memory stage and a second memory stage, each of the plurality of memory stages configured to store at least a portion of the table with keys arranged in ascending or descending order, wherein the first memory stage is configured to perform a first comparison between the first key and at least one key in the portion of the table stored by the first memory stage and to indicate a first range of table entries that may be storing the first key based on the first comparison, wherein the second memory stage is configured to perform a second comparison between the first key and at least one key in the portion of the table stored by the second memory stage based on the first range indicated by the first memory stage, wherein the second memory stage is further configured to indicate a second range of table entries that may be storing the first key based on the second comparison, and wherein the second range is more narrow than the first range; and
   a third memory stage configured to store at least a portion of the table and to retrieve data mapped to the first key by the table based on the second range.

2. The apparatus of claim 1, wherein the apparatus is a network switch, and wherein the apparatus further comprises:
   a plurality of ports, wherein the first key is from a data packet received by one of the ports;
   a queue system configured to buffer data packets in a plurality of egress queues;
   a classifier configured to forward the data packet to at least one of the egress queues based on the data retrieved by the second memory stage; and
   an egress system configured to receive the data packet from the one egress queue and to forward the data packet to the port identified by the data.

3. The apparatus of claim 2, wherein the second memory stage is configured to process the first read request simultaneously as another of the plurality of memory stages is processing a second read request having a second key different than the first key.

4. The apparatus of claim 2, wherein at least one of the plurality of memory stages is configured to perform a half-interval search for narrowing the range of table entries that may be storing the first key.

5. An apparatus, comprising:
   circuitry configured to provide a first read request for reading an entry of a table, the first read request having a first key and the table having a plurality entries, wherein each of the plurality of entries has a respective key and data mapped to the key;
   a memory system configured to store the table, the memory system having a plurality of memory stages configured to process the first read request serially, the plurality of memory stages including at least a first memory stage, a second memory stage, and a third memory stage, each of the memory stages configured to store at least a portion of the table, wherein the first memory stage is configured to compare the first key to at least one key in the portion of the table stored by the first memory stage, to determine whether the first key is greater than or less than the at least one key, and to narrow a range of table entries that may be storing the first key based on whether the first key is determined to be greater than or less than the at least one key, wherein the second memory stage is configured to compare the first key to at least one key in the portion of the table stored by the second memory stage based on the narrowed range, to determine whether the first key is greater than or less than the at least one key in the portion of the table stored by the second memory stage, and to further narrow the narrowed range of table entries that may be storing the first key based on whether the first key is determined to be greater than or less than the at least one key in the portion of the table stored by the second memory stage, and wherein the third memory stage is configured to retrieve data mapped to the first key by the table based on the range of table entries narrowed by the first and second memory stages.

6. The apparatus of claim 5, wherein the apparatus is a network switch, and wherein the apparatus further comprises:

a plurality of ports, wherein the first key is from a data packet received by one of the ports, a queue system configured to buffer data packets in a plurality of egress queues;

a classifier configured to forward the data packet to at least one of the egress queues based on the data retrieved by the second memory stage; and an egress system configured to receive the data packet from the one egress queue and to forward the data packet to the port identified by the data.

7. The apparatus of claim 6, wherein the third memory stage is configured to process the first read request simultaneously as the first memory stage is processing a second read request having a second key different than the first key.

8. The apparatus of claim 6, wherein the third memory stage is configured to store the table, and wherein the portion of the table stored in the first memory stage is less than the table stored in the second memory stage.

9. The apparatus of claim 6, wherein the third memory stage has block random access memory (RAM), wherein the table is stored in the block RAM, wherein the first memory stage has distributed RAM, and wherein the portion of the table stored in the first memory stage is stored in the distributed RAM.

10. The apparatus of claim 6, wherein at least one of the plurality of memory stages is configured to perform a half-interval search for narrowing the range of table entries that may be storing the first key.

11. A method, comprising:
receiving at a memory system a first read request for reading an entry of a table mapping keys to data, wherein the first read request has a first key, wherein the memory system comprises a plurality of memory stages, including at least a first memory stage, a second memory stage, and a third memory stage;

storing at least a portion of the table in the first memory stage, the portion of the table in the first memory stage having a first plurality of the keys arranged in ascending or descending order;

storing at least a portion of the table in the second memory stage, the portion of the table in the second memory stage having a second plurality of the keys arranged in ascending or descending order;

comparing the first key to a second key in the portion of the table in the first memory stage;

providing information, based on the comparing, indicating a first range of table entries that may be storing the first key;

comparing the first key to a third key in the portion of the table in the second memory stage based on the first range;

providing information, based on the comparing the first key to the third key, indicating a second range of table entries that may be storing the first key, wherein the second range is more narrow than the first range;

storing at least a portion of the table in the third memory stage;

retrieving data mapped to the first key by the table from the third memory stage based on the second range; and receiving, from the memory system, the data mapped to the first key by the table.

12. The method of claim 11, wherein the apparatus is a network switch, wherein the data includes port identifiers identifying ports of the network switch, and wherein the method further comprises:
receiving a plurality of data packets at the network switch, wherein the first key is from one of the data packets; and forwarding the one data packet to the port identified by the port identifier.

13. The method of claim 12, further comprising comparing a fourth key from one of the data packets to a key in the portion of the table in the first stage during the retrieving.

14. The method of claim 12, further comprising determining the information using a half-interval search algorithm.

15. The apparatus of claim 1, wherein the third memory stage is configured to process the first read request simultaneously as another of the plurality of memory stages is processing a second read request having a second key different than the first key.

16. The apparatus of claim 1, wherein the first memory stage is configured to determine whether the first key is greater than or less than the at least one key in the portion of the table stored by the first memory stage, and wherein the first range is based on whether the first key is determined to be greater than or less than the at least one key in the portion of the table stored by the first memory stage.

17. The apparatus of claim 16, wherein the second memory stage is configured to determine whether the first key is greater than or less than the at least one key in the portion of the table stored by the second memory stage, and wherein the second range is based on whether the first key is determined to be greater than or less than the at least one key in the portion of the table stored by the second memory stage.

18. The method of claim 11, wherein the comparing the first key to the second key comprises determining whether the first key is greater than or less than the second key.

19. The method of claim 18, wherein the comparing the first key to the third key comprises determining whether the first key is greater than or less than the third key.

* * * * *